United States Patent
Horn et al.

(10) Patent No.: US 12,273,963 B2
(45) Date of Patent: Apr. 8, 2025

(54) REPORTING TECHNIQUES FOR MOVABLE RELAY NODES

(71) Applicant: QUALCOMM Incorporated, San Diego, CA (US)

(72) Inventors: Idan Michael Horn, Hod Hasharon (IL); Shay Landis, Hod Hasharon (IL); Yehonatan Dallal, Kfar Saba (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 841 days.

(21) Appl. No.: 17/388,449

(22) Filed: Jul. 29, 2021

(65) Prior Publication Data

US 2023/0032511 A1 Feb. 2, 2023

(51) Int. Cl.
| | |
|---|---|
| *H04W 88/08* | (2009.01) |
| *H04B 7/04* | (2017.01) |
| *H04B 7/155* | (2006.01) |
| *H04W 8/02* | (2009.01) |
| *H04W 8/24* | (2009.01) |
| *H04W 24/02* | (2009.01) |
| *H04W 24/08* | (2009.01) |
| *H04W 72/20* | (2023.01) |
| *H04W 84/04* | (2009.01) |
| *H04W 88/04* | (2009.01) |

(52) U.S. Cl.
CPC ............ *H04W 88/04* (2013.01); *H04W 8/02* (2013.01); *H04W 8/24* (2013.01); *H04W 24/08* (2013.01); *H04W 72/20* (2023.01)

(58) Field of Classification Search
CPC ....... H04W 72/20; H04W 8/02; H04W 24/08; H04W 88/04; H04W 88/02; H04W 88/06; H04W 88/08; H04W 8/24; H04W 24/02; H04W 72/40; H04W 84/047; H04B 7/04013; H04B 7/04026; H04B 7/15528; G01S 5/0036; G01S 5/0054
See application file for complete search history.

(56) References Cited

U.S. PATENT DOCUMENTS

| | | | | |
|---|---|---|---|---|
| 8,712,444 | B2 * | 4/2014 | Dahl | G01S 5/0289 |
| | | | | 342/450 |
| 9,066,242 | B2 * | 6/2015 | Kazmi | H04W 16/26 |
| 9,131,529 | B1 * | 9/2015 | Ayyagari | G05D 1/104 |
| 11,240,739 | B2 * | 2/2022 | Nylander | H04W 4/38 |

(Continued)

*Primary Examiner* — Jenee Holland
(74) *Attorney, Agent, or Firm* — Holland & Hart LLP

(57) ABSTRACT

Methods, systems, and devices for wireless communications are described. In some examples, a control node may receive, from a movable relay node, a capability message indicating a set of operational parameters for the movable relay node. The control node may determine a location for the movable relay node based on the capability message and may transmit, to the movable relay node, a location message indicating the determined location. The movable relay node may change locations or reconfigure one or more relay devices (e.g., reconfigurable intelligent surfaces) of the movable relay node based on the location message. Accordingly, the control node may use the movable relay node to relay messages between the control node and a second node, which may increase the likelihood of successful communications between the control node and the second node.

28 Claims, 16 Drawing Sheets

(56) References Cited

U.S. PATENT DOCUMENTS

| | | | |
|---|---|---|---|
| 11,444,668 B2* | 9/2022 | Badic | G01S 19/01 |
| 2004/0098395 A1* | 5/2004 | Hisano | G06N 5/022 |
| 2007/0021121 A1* | 1/2007 | Lane | H04W 56/006 |
| | | | 455/67.16 |
| 2007/0021122 A1* | 1/2007 | Lane | H04W 56/0025 |
| | | | 455/67.16 |
| 2011/0138035 A1* | 6/2011 | Dahl | G01S 5/0081 |
| | | | 709/224 |
| 2011/0188398 A1* | 8/2011 | Baba | H04W 40/16 |
| | | | 370/252 |
| 2013/0040558 A1* | 2/2013 | Kazmi | H04W 16/26 |
| | | | 455/7 |
| 2014/0228057 A1* | 8/2014 | Uga | H04W 64/00 |
| | | | 455/456.3 |
| 2015/0015369 A1* | 1/2015 | Lamb | E05F 15/77 |
| | | | 340/5.71 |
| 2016/0259061 A1* | 9/2016 | Carter | G01S 19/28 |
| 2018/0262914 A1* | 9/2018 | Furuichi | H04W 76/14 |
| 2020/0100115 A1* | 3/2020 | Skaaksrud | H04W 4/38 |
| 2020/0203846 A1* | 6/2020 | Harris | H04N 7/20 |
| 2021/0013750 A1* | 1/2021 | Kronander | H02J 50/80 |
| 2021/0297128 A1* | 9/2021 | Badic | H04B 7/0695 |
| 2023/0022225 A1* | 1/2023 | Gunturu | H04B 7/04013 |
| 2023/0048554 A1* | 2/2023 | Hu | H04W 40/22 |
| 2023/0062010 A1* | 3/2023 | Malboubi | H04W 24/08 |
| 2023/0246758 A1* | 8/2023 | Furuyama | H04L 5/0096 |
| | | | 370/329 |
| 2023/0336239 A1* | 10/2023 | Schmidt | H04L 41/0823 |
| 2024/0022927 A1* | 1/2024 | Tong | H04W 4/40 |
| 2024/0027574 A1* | 1/2024 | Zhuang | G01S 7/03 |

* cited by examiner

REPORTING TECHNIQUES FOR MOVABLE RELAY NODES

FIELD OF TECHNOLOGY

The following relates to wireless communications, including reporting techniques for movable relay nodes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a first wireless device may use a line-of-sight (LOS) channel to communicate with a second wireless device. In some cases, however, blockage or interference may reduce a strength of a signal between the first wireless device and the second wireless device using the LOS channel, which may reduce the likelihood of successful communications between the first wireless device and the second wireless device.

SUMMARY

The described techniques relate to improved methods, systems, devices, and apparatuses that support reporting techniques for movable relay nodes. Generally, the described techniques provide for using a movable relay node to improve non-line-of-sight (NLOS) communications between a user equipment (UE) and a base station. In some examples, a control node (e.g., a UE or a base station) may receive a capability message indicating a set of operational parameters associated with a movable relay node. The control node may process the capability message and transmit a location message to the movable relay node based on the capability message. The location message may indicate a location for the movable relay node. The movable relay node may configure one or more relay devices of the movable relay node based on the location message. Accordingly, the control node may use the movable relay node to relay messages between the control node and a second node, which may increase the likelihood of successful communications between the control node and the second node.

A method for wireless communications at a control node is described. The method may include receiving, from a movable relay node, a capability message indicating a set of operational parameters for the movable relay node, transmitting, to the movable relay node at a first location and based on receiving the capability message, a location message indicating a second location for the movable relay node, and communicating with a second node via the movable relay node based on transmitting the location message.

An apparatus for wireless communications at a control node is described. The apparatus may include a processor, memory coupled with the processor, and instructions stored in the memory. The instructions may be executable by the processor to cause the apparatus to receive, from a movable relay node, a capability message indicating a set of operational parameters for the movable relay node, transmit, to the movable relay node at a first location and based on receiving the capability message, a location message indicating a second location for the movable relay node, and communicate with a second node via the movable relay node based on transmitting the location message.

Another apparatus for wireless communications at a control node is described. The apparatus may include means for receiving, from a movable relay node, a capability message indicating a set of operational parameters for the movable relay node, means for transmitting, to the movable relay node at a first location and based on receiving the capability message, a location message indicating a second location for the movable relay node, and means for communicating with a second node via the movable relay node based on transmitting the location message.

A non-transitory computer-readable medium storing code for wireless communications at a control node is described. The code may include instructions executable by a processor to receive, from a movable relay node, a capability message indicating a set of operational parameters for the movable relay node, transmit, to the movable relay node at a first location and based on receiving the capability message, a location message indicating a second location for the movable relay node, and communicate with a second node via the movable relay node based on transmitting the location message.

Some examples of the method, apparatuses, and non-transitory computer-readable medium described herein may further include operations, features, means, or instructions for receiving an indication that the movable relay node may be positioned at the second location, where communicating with the second node via the movable relay node may be further based on receiving the indication.

In some examples of the method, apparatuses, and non-transitory computer-readable medium described herein, the location message indicates a set of possible locations including the second location and the method, apparatuses, and non-transitory computer-readable medium may include further operations, features, means, or instructions for receiving an indication that the movable relay node may be positioned at the second location of the set of possible locations, where communicating with the second node via the movable relay node may be further based on receiving the indication.

Some examples of the method, apparatuses, and non-transitory computer-readable medium described herein may further include operations, features, means, or instructions for receiving an indication that the movable relay node may be unable to be positioned at the second location, where communicating with the second node may be further based on receiving the indication.

In some examples of the method, apparatuses, and non-transitory computer-readable medium described herein, the set of operational parameters indicated by the capability message includes a type of the movable relay node, a quantity of movement dimensions capable by the movable relay node, a maximum speed of the movable relay node, an average speed of the movable relay node, stability information associated the movable relay node, an altitude limit of the movable relay node, a power level of the movable relay node, a battery status of the movable relay node, or a combination thereof.

In some examples of the method, apparatuses, and non-transitory computer-readable medium described herein, the movable relay node includes one or more UEs, one or more reconfigurable intelligent surfaces (RISs) configured to relay signals in a wireless communications network, or a combination thereof.

In some examples of the method, apparatuses, and non-transitory computer-readable medium described herein, the set of operational parameters includes a quantity of the one or more UEs, types of the one or more UEs, capabilities of the one or more UEs, sizes of the one or more RISs, path loss values associated with the one or more RISs, frequency ranges supported by the one or more RISs, reflection angles of the one or more RISs with respect to a reference plane, or a combination thereof.

Some examples of the method, apparatuses, and non-transitory computer-readable medium described herein may further include operations, features, means, or instructions for determining a link budget calculation for a wireless channel between the control node and the movable relay node, a maximum permissible exposure (MPE) value for the control node, image processing data generated by sensors of the control node, a reference signal received power (RSRP) measurement, a signal to interference power ratio (SIR), an angle between the control node and the movable relay node, a speed message from the movable relay node, or a combination thereof, where transmitting the location message to the movable relay node may be based on the determining.

Some examples of the method, apparatuses, and non-transitory computer-readable medium described herein may further include operations, features, means, or instructions for receiving, from the movable relay node, a first message indicating an identifier of the movable relay node, transmitting, to the movable relay node and based on receiving the first message, a second message indicating an identifier of the control node, and receiving, from the movable relay node and based on transmitting the second message, a sidelink transmission including the capability message, the identifier of the control node, and the identifier of the movable relay node.

In some examples of the method, apparatuses, and non-transitory computer-readable medium described herein, transmitting the location message may include operations, features, means, or instructions for transmitting, to the movable relay node, a sidelink transmission including the location message, an identifier of the movable relay node, and an identifier of the control node.

Some examples of the method, apparatuses, and non-transitory computer-readable medium described herein may further include operations, features, means, or instructions for receiving, from the second node, control signaling indicating positions of one or more transmission and reception points (TRPs) associated with the second node, where transmitting the location message to the movable relay node may be based on receiving the control signaling from the second node.

In some examples of the method, apparatuses, and non-transitory computer-readable medium described herein, the control node includes a UE and the second node includes a base station and the control signaling includes a radio resource control (RRC) message, a medium access control (MAC)-control element (CE), or both.

Some examples of the method, apparatuses, and non-transitory computer-readable medium described herein may further include operations, features, means, or instructions for determining positions of one or more TRPs associated with the second node based on image processing data generated by one or more sensors of the control node, where transmitting the location message may be based on determining the positions of the one or more TRPs.

Some examples of the method, apparatuses, and non-transitory computer-readable medium described herein may further include operations, features, means, or instructions for receiving, from the second node, a request for the movable relay node to relay communications between the control node and the second node and transmitting, to the second node and in response to the request for the movable relay node, an indication that the movable relay node may be positioned for the second node.

In some examples of the method, apparatuses, and non-transitory computer-readable medium described herein, the control node includes a base station and the second node includes a UE and the indication includes an RRC message, a MAC-CE, or both.

In some examples of the method, apparatuses, and non-transitory computer-readable medium described herein, the second location includes a location in a global navigation satellite system (GNSS), an altitude above a reference point, or both.

Some examples of the method, apparatuses, and non-transitory computer-readable medium described herein may further include operations, features, means, or instructions for determining the second location for the movable relay node based on the set of operational parameters, a set of channel measurements, image processing data generated by sensors at the control node, or a combination thereof, where transmitting the location message may be based on determining the second location.

A method for wireless communications at a movable relay node is described. The method may include transmitting, to a control node, a capability message indicating a set of operational parameters for the movable relay node, receiving, from the control node and based on transmitting the capability message, a location message indicating a first location for the movable relay node, and configuring one or more RISs at the movable relay node based on receiving the location message.

An apparatus for wireless communications at a movable relay node is described. The apparatus may include a processor, memory coupled with the processor, and instructions stored in the memory. The instructions may be executable by the processor to cause the apparatus to transmit, to a control node, a capability message indicating a set of operational parameters for the movable relay node, receive, from the control node and based on transmitting the capability message, a location message indicating a first location for the movable relay node, and configure one or more RISs at the movable relay node based on receiving the location message.

Another apparatus for wireless communications at a movable relay node is described. The apparatus may include means for transmitting, to a control node, a capability message indicating a set of operational parameters for the movable relay node, means for receiving, from the control node and based on transmitting the capability message, a location message indicating a first location for the movable relay node, and means for configuring one or more RISs at the movable relay node based on receiving the location message.

A non-transitory computer-readable medium storing code for wireless communications at a movable relay node is described. The code may include instructions executable by a processor to transmit, to a control node, a capability message indicating a set of operational parameters for the movable relay node, receive, from the control node and based on transmitting the capability message, a location message indicating a first location for the movable relay node, and configure one or more RISs at the movable relay node based on receiving the location message.

Some examples of the method, apparatuses, and non-transitory computer-readable medium described herein may further include operations, features, means, or instructions for transmitting, to the control node, an indication that the movable relay node may be positioned at the first location, where configuring the one or more RISs at the movable relay node may be further based on transmitting the indication.

Some examples of the method, apparatuses, and non-transitory computer-readable medium described herein may further include operations, features, means, or instructions for transmitting, to the control node, an indication that the movable relay node may be unable to be positioned at the first location, where configuring the one or more RISs at the movable relay node may be further based on transmitting the indication.

Some examples of the method, apparatuses, and non-transitory computer-readable medium described herein may further include operations, features, means, or instructions for receiving, from a second movable relay node, a sidelink transmission including a safety message, where configuring the one or more RISs at the movable relay node may be further based on receiving the sidelink transmission from the second movable relay node.

In some examples of the method, apparatuses, and non-transitory computer-readable medium described herein, the set of operational parameters indicated by the capability message includes a type of the movable relay node, a quantity of movement dimensions capable by the movable relay node, a maximum speed of the movable relay node, an average speed of the movable relay node, stability information associated the movable relay node, an altitude limit of the movable relay node, a power level of the movable relay node, a battery status of the movable relay node, or a combination thereof.

In some examples of the method, apparatuses, and non-transitory computer-readable medium described herein, the movable relay node includes one or more UEs and the set of operational parameters includes a quantity of the one or more UEs, types of the one or more UEs, capabilities of the one or more UEs, sizes of the one or more RISs, path loss values associated with the one or more RISs, frequency ranges supported by the one or more RISs, reflection angles of the one or more RISs with respect to a reference plane, or a combination thereof.

Some examples of the method, apparatuses, and non-transitory computer-readable medium described herein may further include operations, features, means, or instructions for transmitting a first message indicating an identifier of the movable relay node, receiving, from the control node and based on transmitting the first message, a second message indicating an identifier of the control node, and transmitting, to the control node and based on receiving the second message, a sidelink transmission including the capability message, the identifier of the movable relay node, and the identifier of the control node.

In some examples of the method, apparatuses, and non-transitory computer-readable medium described herein, receiving the location message may include operations, features, means, or instructions for receiving, from the control node, a sidelink transmission including the location message, an identifier of the movable relay node, and an identifier of the control node.

Some examples of the method, apparatuses, and non-transitory computer-readable medium described herein may further include operations, features, means, or instructions for receiving, from the control node, a request to relay communications between the control node and a second node, where configuring the one or more RISs at the movable relay node may be based on receiving the request.

DETAILED DESCRIPTION

Figure 1:
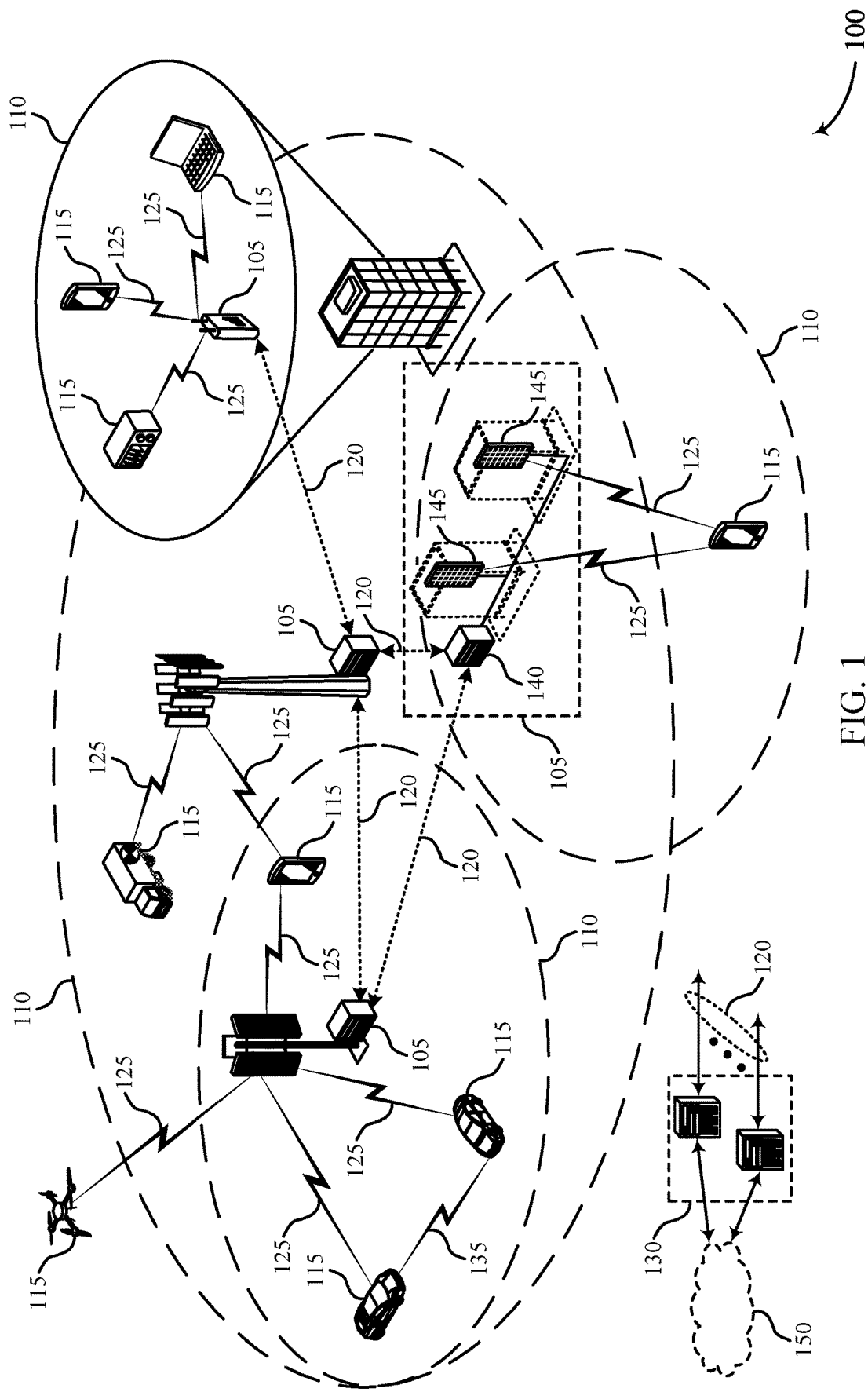
FIGS. 1-3 illustrate examples of wireless communications systems that support reporting techniques for movable relay nodes in accordance with aspects of the present disclosure.

In some wireless communications systems, wireless devices operating in higher frequency bands (e.g., millimeter wave (mmW) frequency bands) may have a higher likelihood of successfully communicating when there is a line-of-sight (LOS) channel between the wireless devices. If, for example, a LOS channel between the wireless devices is obstructed, the wireless devices may experience higher path loss and lower signal quality, which may reduce the likelihood of successful communications between the wireless devices.

To improve the likelihood of successful communications between wireless devices operating in these frequency bands, a network operator may add more network entities (e.g., cells) to the wireless communications system. These network entities may improve overall coverage and throughput levels of the wireless communications system, but may be unable to provide dynamic LOS channels for moving wireless devices, such as user equipments (UEs). In addition, configuring and installing these network entities may be a relatively slow and expensive process.

In accordance with aspects of the present disclosure, a network operator may use movable relay nodes (e.g., drones) equipped with reconfigurable intelligent surfaces (RISs) to provide dynamic LOS channels for wireless devices operating in higher frequency bands. For example, a first wireless device (e.g., a UE or a base station) may configure a movable relay node to relay (e.g., reflect) communications between the first wireless device and a second wireless device (e.g., a UE or a base station). Configuring the movable relay node to relay communications between the first wireless device and the second wireless device may improve the likelihood of successful communications between the first wireless device and the second wireless device, and may also result in greater cell coverage, higher throughput levels, and improved communication reliability, among other benefits.

In some examples, the movable relay node may transmit a capability message to the first wireless device. The capability message may indicate one or more operational parameters (e.g., capabilities) of the movable relay node. The first wireless device may transmit a location message to the movable relay node based on receiving the capability message. The location message may indicate a location for the movable relay node. The movable relay node may change locations or adjust one or more RISs or both based on the location report. In some examples, the movable relay node may transmit positioning information to the first wireless device in response to the location message. The positioning information may indicate whether the first wireless device is positioned at the location indicated by the location message. Accordingly, the first wireless device may use the movable relay node to communicate with the second wireless device.

Aspects of the present disclosure may be implemented to realize one or more of the following advantages. The described techniques may provide for greater cell coverage, higher throughput levels, and improved communication reliability in higher frequency bands. For example, the described techniques may enable a first wireless device to communicate with a second wireless device via a movable relay node when there is no direct communication link between the first wireless device and the second wireless device. As such, the movable relay node may improve the likelihood of successful communications between the first wireless device and the second wireless device. In addition, the described techniques may provide for reduced signaling overhead based on reducing a cyclic prefix (CP) length for communications between the first wireless device and the second wireless device.

Aspects of the disclosure are initially described in the context of wireless communications systems and process flows. Aspects of the disclosure are further illustrated by and described with reference to apparatus diagrams, system diagrams, and flowcharts that relate to reporting techniques for movable relay nodes.

FIG. 1 illustrates an example of a wireless communications system 100 that supports reporting techniques for movable relay nodes in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/$ $(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRP). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmW communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some wireless communications systems (e.g., wireless communications systems that support 5G-NR), a base station 105 may communicate with a UE 115 using a non-line-of-sight (NLOS) channel. That is, there may be no visual direct path between active antenna arrays of the UE 115 and active antenna arrays of the base station 105. Communicating via NLOS channels may be difficult due to an increase in free space path loss (e.g., as described in the Friis transmission equation) and atmosphere attenuation when using higher carrier frequencies (e.g., mmW frequencies). Thus, LOS channels may improve the likelihood of successful communications between the UE 115 and the base station 105 in higher frequency bands (e.g., frequency range 4 (FR4), frequency range 5 (FR5), or other frequency bands that support sixth generation (6G) communications) because LOS channels may result in shorter paths between the UE 115 and the base station 105.

To mitigate path losses associated with NLOS channels, network operators may add more cells in locations with low coverage or fewer LOS channels. However, adding cells may result in higher operating costs for network operators. Additionally, these cells may take a relatively long time to build, and may not provide a dynamic solution for fluctuating channel conditions. In other examples, network operators may employ dynamic (e.g., flying) network elements that can provide LOS channels in coverage areas with dynamic channel conditions. This network element may be a drone, vehicle, robot, or any other device that is capable of dynamically changing locations. Once the network element is positioned, the network element may communicate with UEs 115 in the network to provide the most efficient LOS channels (e.g., for the UEs 115) as well as for safety (e.g., to not collide with other UEs 115).

The network element, which may be equivalently referred to as a drone or a movable relay, may consume less power than other network entities (e.g., amplifiers, relays) and may be more effective at relaying communications in higher bands (e.g., in comparison to static network entities). For example, the network element may include one or more RISs that can relay communications in higher bands with greater power efficiency than other network entities. Specifically, these RISs may be capable of relaying communications without power amplifiers (PAs) or low-noise amplifiers (LNAs), which may reduce power consumption at the network element. In addition, the network element may be capable of moving in three dimensions, which may increase the ability of the network element to provide LOS channels for other devices in the network. The network element may also be capable of remaining in the same location for a relatively long time without interfering with other devices (e.g., vehicles) in the network. The network element may enable devices to communicate at relatively longer distances (e.g., 100 meters) with relatively higher signal qualities (e.g., SNR above 10 decibels (dBs))

In accordance with aspects of the present disclosure, the network element may operate with improved efficiency based on transmitting a capability message to other devices (e.g., UEs 115 and base stations 105) in the network. The capability message, which may be equivalently referred to as a moving UE capability report or a drone capability report, may indicate a capability of the network element to provide a LOS channel for the other devices. The capability message may enable the other devices to use the network element with improved efficiency, which may improve overall cell throughput.

In some examples, a control node (e.g., a UE 115 or a base station 105) may use an algorithm to determine an optimal location for the network element (e.g., with respect to channel conditions of the control node) based on various data inputs, such as a location of the control node, a location of a second node in communication with the control node, current and estimated movement patterns of the control node, sensor fusion data (e.g., image sensor data obtained by extended reality (XR) glasses), or array capabilities of the control node, among other examples. In such examples, the control node may utilize the algorithm to determine the optimal location for the network element (e.g., drone) and may report the determined location to the network element. This location report may enable the network element to improve channel conditions for the control node (e.g., based on providing a LOS channel for the control node and the second node), which may improve throughput and coverage levels in the network.

Figure 2:
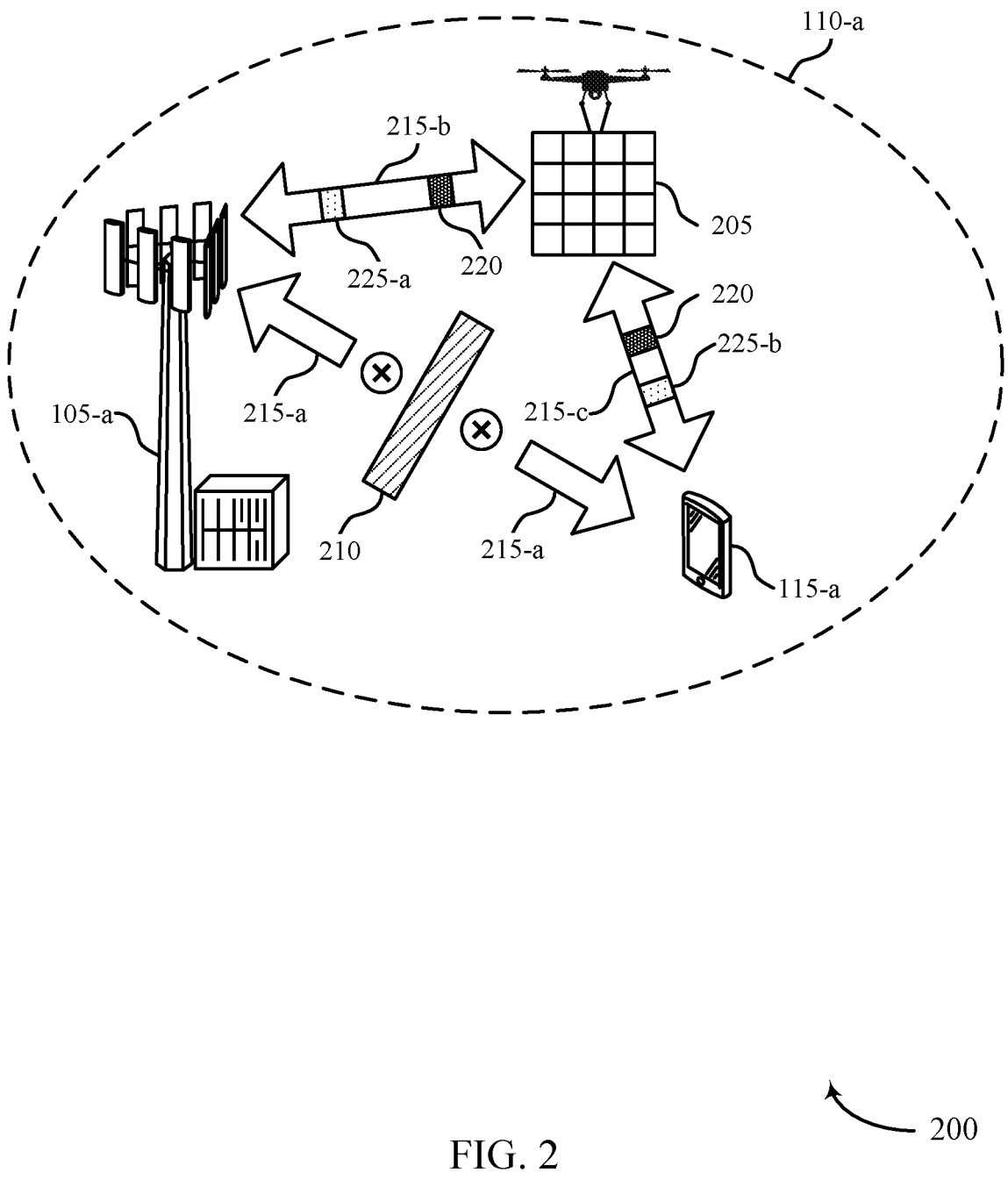

FIG. 2 illustrates an example of a wireless communications system 200 that supports reporting techniques for movable relay nodes in accordance with aspects of the present disclosure. The wireless communications system 200 may implement or be implemented by aspects of the wireless communications system 100. For example, the wireless communications system 200 may include a base station 105-a and a UE 115-a, which may be examples of corresponding devices described with reference to FIG. 1. The base station 105-a and the UE 115-a may communicate within a geographic coverage area 110-a, which may be an example of a geographic coverage area 110 described with reference to FIG. 1. In the wireless communications system 200, the base station 105-a may use a movable relay node 205 to communicate with the UE 115-a when a communication link 215-a (e.g., a LOS channel) between the base station 105-a and the UE 115-a is blocked by an obstruction 210.

In the example of FIG. 2, the movable relay node 205 may transmit a capability message 220 to the UE 115-a, the base station 105-a, or both. For example, the movable relay node 205 may transmit the capability message 220 to the base station 105-a via a communication link 215-b, and may transmit the capability message 220 to the UE 115-a via a communication link 215-c. Accordingly, one or both of the UE 115-a and the base station 105-a may transmit location messages 225 to the movable relay node 205 based on the capability message 220. For example, the base station 105-a may transmit a location message 225-a to the movable relay node 205 via the communication link 215-b and the UE 115-a may transmit a location message 225-b to the movable relay node 205 via the communication link 215-c. In some examples, the movable relay node 205 may change locations or configure one or more RISs of the movable relay node 205 based on receiving the location messages 225. Accordingly, the movable relay node 205 may relay communications between the UE 115-a and the base station 105-a. For example, the base station 105-a may transmit a downlink message via the communication link 215-b and the movable relay node 205 may relay (e.g., reflect) the downlink message to the UE 115-a via the communication link 215-c.

The capability message 220 (e.g., a moving UE capability report) may include a number of moving dimensions for the movable relay node 205 (e.g., assuming that the movable relay node 205 can move). This number of moving dimensions may be represented by a single bit that indicates either a two-dimensional movement capability or a three-dimensional movement capability. The capability message 220 may also indicate a highest or average speed of the movable relay node 205, a battery status or remaining air time of the movable relay node 205, a capability of the movable relay node 205 to remain in the same location, stability information for the movable relay node 205 (e.g., a minimum or average time that the movable relay node 205 can remain in the same location, which may be 0 seconds if the movable relay node 205 is a vehicle), or a combination thereof.

In some examples, the movable relay node 205 may include one or more relay devices such as one or more RISs, one or more receive/transmit devices, or a combination thereof. In such examples, the capability message 220 may indicate array parameters associated with the one or more relay devices, such as RISs. For example, the capability message 220 may indicate a size for each RIS (e.g., such that the UE 115-a or the base station 105-a can use a compatible beam width), array losses associated with each RIS (which may be indicated per angle of arrival), or frequencies supported by the one or more RISs, among other examples. The capability message 220 may include one or more parameters for repositioning the one or more RISs relative to the movable relay node or relative to a reference plane. Additionally or alternatively, the capability message 220 may indicate a number of drones configured for the movable relay node 205 (e.g., if multiple drones are assigned to the UE 115-a and are configured with the same operational parameters).

The movable relay node 205 may indicate the capability message 220 via RRC signaling or a MAC-control element (CE) using non-standalone communications (e.g., for lower frequency bands) or standalone communications (e.g., for higher frequency bands), provided that there is a link between the base station 105-a and the UE 115-a that supports such standalone communications. In other examples, the movable relay node 205 may indicate the capability message 220 via sidelink communications. For example, the movable relay node 205 may transmit a broadband communication indicating an identifier (ID) of the movable relay node 205. In response to the broadband communication, the UE 115-a may transmit a message indicating an ID of the UE 115-a. If, for example, the movable relay node 205 is selected for the UE 115-a (e.g., to improve channel conditions for the UE 115-a), the movable relay node 205 may transmit the capability message 220 to the UE 115-a via the communication link 215-c, and may append both the ID of the movable relay node 205 and the ID of the UE 115-a to the capability message 220. In some examples, the movable relay node 205 may transmit the capability message 220 as a power-efficient, single-carrier waveform (e.g., for flat channel conditions). In other examples, the movable relay node 205 may transmit the capability message 220 as a power-efficient DFT-S-OFDM waveform.

The capability message 220 may provide alternate LOS channels for the UE 115-a and the base station 105-a, which may improve communications between the UE 115-a and the base station 105-a in higher frequency bands (e.g., mmW frequency bands). As a result, the capability message 220 may increase coverage and overall cell throughput in the wireless communications system 200. The capability message may also enable further optimization between the UE 115-a and other UEs 115 in the wireless communications system 200.

The location messages 225 may indicate a location for the movable relay node 205. In some examples, the location messages 225 may be based on link budget calculations for the communication links 215, a distance between the base station 105-a (or a TRP associated with the base station 105-a) and the movable relay node 205, a downlink or uplink equivalent isotropic radiated power (EIRP) measurement, carrier frequencies of the base station 105-a, path losses associated with RISs of the movable relay node 205, a maximum permissible exposure (MPE) value for the UE 115-a, sensor fusion data acquired by the UE 115-a (e.g., if the UE 115-a is an example of an XR device), one or more channel measurements (e.g., reference signal received power (RSRP), signal to interference power ratio (SIR)) associated with the communication links 215, a plane of the movable relay node 205, a drone speed report transmitted by the movable relay node 205, or a combination thereof. That is, the location messages 225 may be based on sensor fusion data obtained by the UE 115-a, global positioning system (GPS) data, link budget calculations (which may be based on the capability message 220), movement indicators, MPE data, or a combination thereof.

If, for example, the UE 115-a is an XR device, the UE 115-a may perform image processing to identify the obstruction 210 (e.g., a blocker) and may determine a suitable location for the movable relay node 205 based on identifying the obstruction 210. In some examples, if the base station 105-a determines that an SIR of the communication link 215-b is above a threshold (e.g., if the communication link 215-b does not have flat channel conditions), the base station 105-a may determine a location for the movable relay node 205 that results in a lower SIR for the communication link 215-b. In other examples, the UE 115-a may determine an angle or arrival (e.g., for signals arriving at the movable relay node 205) or a transmit beam (e.g., for the UE 115-a), and may transmit an indication of these parameters to the movable relay node 205 (e.g., in the location message 225-b) such that the movable relay node 205 can place one or more arrays (e.g., RISs) in a non-parallel plane to the ground.

In some examples, the UE 115-a or the base station 105-a may calculate, based on receiving a drone speed report from the movable relay node 205, a time for the movable relay node 205 to reach a specific location, and may determine a location for the movable relay node 205 accordingly. Additionally or alternatively, the UE 115-a may determine angles at which the UE 115-a has MPE limitations and may exclude these angles when determining a suitable position for the movable relay node 205.

To initiate a connection between the movable relay node 205 and the UE 115-a, the UE 115-a may transmit a request for the base station 105-a to supply the movable relay node 205 for use by the UE 115-a. Alternatively, the UE 115-a can establish a connection directly with the movable relay node 205 (e.g., using sidelink communications). In some examples, the base station 105-a may transmit control signaling (e.g., RRC signaling or a MAC-CE) to the UE 115-a that indicates locations and corresponding frequency ranges for one or more TRPs associated with the base station 105-a. Alternatively, if the UE 115-a does not receive control signaling from the base station 105-a, the UE 115-a can use sensor fusion data to estimate locations for the one or more TRPs (e.g., if the UE 115-a is an XR device).

In some examples, the location messages 225 may be obtained by the movable relay node 205 using sidelink communications. For example, if the UE 115-a acquires an ID of the movable relay node 205 and the movable relay node 205 acquires an ID of the UE 115-a, the UE 115-a can transmit (e.g., in the location message 225-b) a list of possible locations for the movable relay node 205 (sorted by priority) along with the ID of the movable relay node 205 and the ID of the UE 115-a. Including these IDs in the location message 225-b may ensure that the location message 225-b is correctly received by the movable relay node 205. In some examples (e.g., for flat channel conditions), the UE 115-a or the base station 105-a may transmit the location messages 225 as power-efficient, single-carrier waveforms. In other examples, the UE 115-a or the base station 105-a may transmit the location messages 225 as power-efficient DFT-S-OFDM waveforms. In some examples, the base station 105-a may use sidelink communications to communicate with the movable relay node 205.

If, for example, the movable relay node 205 is unable to reach a location indicated by the location messages 225, the movable relay node 205 may signal (e.g., to the UE 115-a or the base station 105-a) that the movable relay node 205 is unable to reach the indicated location. Additionally or alternatively, if the movable relay node 205 changes locations (e.g., due to strong wind or to avoid collisions with other drones), the movable relay node 205 may transmit an indication of the location change to one or both of the UE 115-a and the base station 105-a.

The location messages 225 may provide for improved channel conditions in mmW frequency bands (and other high frequency bands) based on providing alternate LOS channels between the UE 115-a and the base station 105-a. Specifically, the location messages 225 may enable the movable relay node 205 to dynamically change locations to provide improved channel conditions (e.g., LOS channels) for the UE 115-a and the base station 105-a in these higher frequency bands As such, the location messages 225 may increase overall coverage and throughput in the wireless communications system 200.

Figure 3:
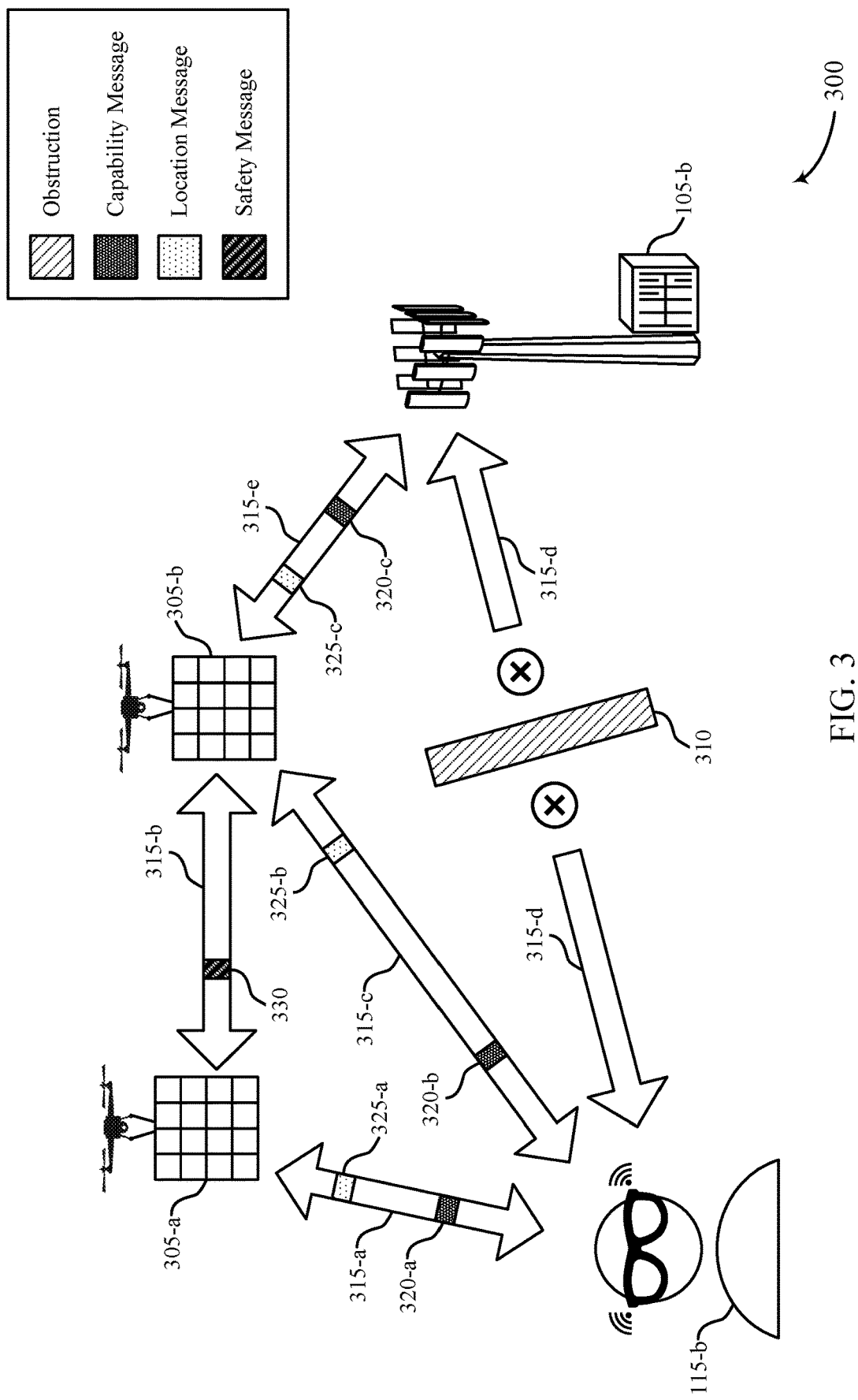

FIG. 3 illustrates an example of a wireless communications system 300 that supports reporting techniques for movable relay nodes in accordance with aspects of the present disclosure. The wireless communications system 300 may implement or be implemented by aspects of the wireless communications system 100 or the wireless communications system 200. For example, the wireless communications system 300 may include a UE 115-b (e.g., XR glasses) and a base station 105-b, which may be examples of corresponding devices described with reference to FIGS. 1 and 2. Additionally, the wireless communications system 300 may include a movable relay node 305-a and a movable relay node 305-b, which may be examples of a movable relay node 205 described with reference to FIG. 2. In the wireless communications system 300, the movable relay nodes 305 may relay communications between the UE 115-b and the base station 105-b when the UE 115-b is unable to communicate with the base station 105-b via a communication link 315-d (e.g., a LOS channel).

In the example of FIG. 3, the UE 115-b may use the movable relay nodes 305 to communicate with the base station 105-b. For example, if the obstruction 310 prevents the UE 115-b from communicating with the base station 105-b via the communication link 315-d, the UE 115-b may use a movable relay node 305-a to communicate with the base station 105-b via a communication link 315-a. Additionally or alternatively, the UE 115-b may use a movable relay node 305-b to communicate with the base station 105-b via a communication link 315-c and a communication link 315-e. Specifically, the UE 115-b may transmit a message to the movable relay node 305-b via the communication link 315-c and the movable relay node 305-b may relay (e.g., reflect) the message to the base station 105-b via the communication link 315-e.

The movable relay nodes 305 may transmit capability messages 320 to the UE 115-b, the base station 105-b, or both. For example, the movable relay node 305-a may transmit a capability message 320-a to the UE 115-b via the communication link 315-a. Additionally or alternatively, the movable relay node 305-b may transmit a capability message 320-b to the UE 115-b via the communication link 315-c and may transmit a capability message 320-c to the base station 105-b via the communication link 315-e. The capability messages 320 may indicate various operational capabilities of the movable relay nodes 305. For example, the capability message 320-a may indicate movement capabilities (e.g., maximum speed, maximum altitude, number of movement directions) of the movable relay node 305-a, device capabilities (e.g., a number of drones, a number of RISs) of the movable relay node 305-a, stability information for the movable relay node 305-*a*, a power status (e.g., battery life) of the movable relay node 305-*a*, or a combination thereof.

One or both of the UE 115-*b* and the base station 105-*b* may transmit location messages 325 to the movable relay nodes 305 based on the capability messages 320. For example, the UE 115-*b* may transmit a location message 325-*a* to the movable relay node 305-*a* via the communication link 315-*a* and may transmit a location message 325-*b* to the movable relay node 305-*b* via the communication link 315-*b*. Likewise, the base station 105-*b* may transmit a location message 325-*c* to the movable relay node 305-*b* via the communication link 315-*e*. The location messages 325 may indicate locations for the movable relay nodes 305. For example, the location message 325-*b* may include a specific location (or a set of possible locations) for the movable relay node 305-*b*. In some examples, the location messages 325 may specify a set of global navigation satellite system (GNSS) coordinates, a set of GPS coordinates, an altitude above a reference point (e.g., sea level), or a combination thereof. In other examples, the location messages 325 may specify locations for the movable relay nodes 305 with respect to current positions of the movable relay nodes. That is, the location messages 325 may indicate locations for the movable relay nodes 305 as offsets from the current positions of the movable relay nodes 305.

The UE 115-*b* and the base station 105-*b* may transmit the location messages 325 based on various inputs. For example, the UE 115-*b* may determine a location for the movable relay node 305-*b* based on a link budget calculation associated with the communication link 315-*c*, one or more channel measurements (e.g., RSRP, SIR, MPE, EIRP) associated with the communication link 315-*c*, image sensor data acquired by the UE 115-*b* (e.g., sensor fusion data), a drone speed report received from the movable relay node 305-*b*, a RIS configuration of the movable relay node 305-*b*, or a combination thereof. Accordingly, the UE 115-*b* may transmit an indication of the determined location in the location message 325-*b*.

The movable relay nodes 305 may change locations based on receiving the location messages 325 from the UE 115-*b*, the base station 105-*b*, or both. For example, if the location message 325-*a* indicates a first location for the movable relay node 305-*a*, the movable relay node 305-*a* may attempt to move to the first location based on receiving the location message 325-*a*. In some examples, if the movable relay node 305-*a* is unable to reach the first location (e.g., if there are strong winds or if the first location is above a maximum altitude of the movable relay node 305-*a*), the movable relay node 305-*a* may inform the UE 115-*b* that the movable relay node 305-*a* is unable to reach the first location. Alternatively, the movable relay node 305-*a* may inform the UE 115-*b* that the movable relay node 305-*a* is positioned at the first location.

In some examples, the movable relay node 305-*b* may receive a safety message 330 from the movable relay node 305-*a* via a communication link 315-*b*. The movable relay node 305-*a* may transmit the safety message in a specific radio frequency spectrum band (e.g., frequency range 1 (FR1)) The safety message 330, which may be equivalently referred to as a safety report or a sidelink safety report, may be used to ensure that the movable relay nodes 305 maintain sufficient spatial separation during operation. If, for example, the movable relay node 305-*b* determines that the movable relay node 305-*a* is proximate to the movable relay node 305-*b* (e.g., based on the safety message 330), the movable relay node 305-*b* may change locations to prevent collisions between the movable relay nodes 305.

Using the movable relay nodes 305 to relay communications between the UE 115-*b* and the base station 105-*b* may improve the likelihood of successful communications between the UE 115-*b* and the base station 105-*b*. For example, if the communication link 315-*d* (e.g., a LOS channel) between the UE 115-*b* and the base station 105-*b* is blocked by the obstruction 310, the movable relay nodes 305 may provide alternate channels between the UE 115-*b* and the base station 105-*b*. As such, the movable relay nodes 305 may improve the reliability of communications between the UE 115-*b* and the base station 105-*b*, among other benefits.

Figure 4:
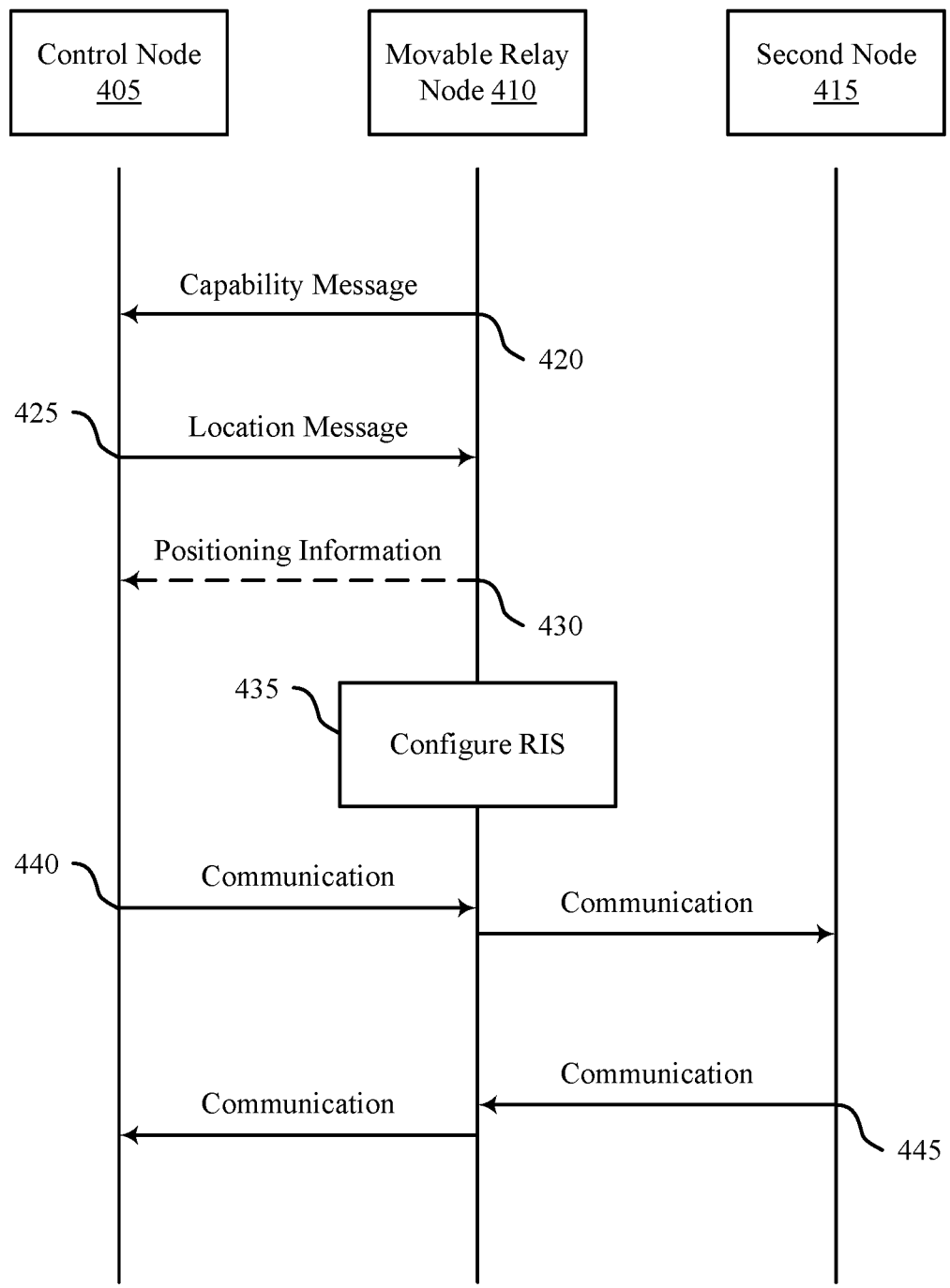
FIG. 4 illustrates an example of a process flow that supports reporting techniques for movable relay nodes in accordance with aspects of the present disclosure.

FIG. 4 illustrates an example of a process flow 400 that supports reporting techniques for movable relay nodes in accordance with aspects of the present disclosure. The process flow 400 may implement or be implemented by aspects of the wireless communications system 100, the wireless communications system 200, or the wireless communications system 300. For example, the process flow 400 may include a control node 405 and a second node 415, which may be examples of a UE 115 or a base station 105 as described with reference to FIGS. 1-3. In some cases, the control node 405 (e.g., the node that controls the movable relay node 410) may be an example of a UE 115 and the second node 415 may be an example of a base station 105 or another UE 115. In other cases, the control node 405 may be an example of a base station 105 and the second node 415 may be an example of a UE 115. Additionally, the process flow 400 may include a movable relay node 410, which may be an example of a movable relay node 205 or a movable relay node 305 as described with reference to FIGS. 2 and 3. In the following description of the process flow 400, operations between the control node 405, the movable relay node 410, and the second node 415 may be performed in a different order or at a different time than as shown. Additionally or alternatively, some operations may be omitted from the process flow 400, and other operations may be added to the process flow 400.

At 420, the movable relay node 410 may transmit a capability message to the control node 405. The capability message may indicate a set of operational parameters for the movable relay node 410. For example, the capability message may indicate a quantity of dimensions in which the movable relay node 410 is capable of moving, a battery charge level of the movable relay node 410, a quantity of drones associated with the movable relay node 410, a quantity of RISs associated with the movable relay node 410, capability information (e.g., sizes, array losses, frequency ranges) associated with the quantity of RISs, a current location of the movable relay node 410, a maximum speed of the movable relay node 410, stability information associated with the movable relay node 410, or a combination thereof. In some examples, the movable relay node 410 may transmit control signaling (e.g., RRC signaling, a MAC-CE) that indicates the capability message. In other examples, the movable relay node 410 may transmit a sidelink message (e.g., a PSCCH transmission, a PSSCH transmission) that indicates the capability message.

At 425, the control node 405 may transmit a location message to the movable relay node 410 based on the capability message. The location message may include a request for the movable relay node 410 to move to a first location. Additionally or alternatively, the location message may include an ID of the movable relay node 410, an ID of the control node 405, or both. The control node 405 may determine the first location (e.g., a preferred location for the movable relay node 410) based on information from the capability message, one or more channel measurements (e.g., EIRP, MPE, RSRP, SIR) performed by the control node 405, image processing data generated by sensors at the control node 405, a drone speed report received from the movable relay node 410, or a combination thereof. In some examples, the control node 405 may transmit a sidelink message (e.g., a physical sidelink control channel (PSCCH) transmission or a physical sidelink shared channel (PSSCH) transmission) that indicates the location message.

At 430, the control node 405 may receive positioning information from the movable relay node 410. The positioning information may indicate whether the movable relay node 410 is positioned at the first location (e.g., the location indicated by the location message) or not. For example, the positioning information may indicate that the movable relay node 410 is unable to reach the first location (e.g., due to environmental conditions). In such examples, the positioning information may indicate a current location of the movable relay node 410 (e.g., if the current location is different from the first location). Alternatively, the positioning information may indicate that the movable relay node 410 is positioned at the first location.

At 435, the movable relay node 410 may configure one or more RISs of the movable relay node 410 based on the location message and the positioning information. Specifically, the movable relay node 410 may configure the one or more RISs to relay (e.g., reflect) communications between the control node 405 and the second node 415. For example, the movable relay node 410 may adjust a reflection angle of the one or more RISs with respect to a reference plane (e.g., the ground, a reference point or surface of the movable relay node 410, other RISs). In some examples, if the movable relay node 410 includes multiple drones equipped with RISs, the movable relay node 410 may configure the drones with different RIS configurations.

At 440, the movable relay node 410 may relay communications from the control node 405 to the second node 415 based on configuring the one or more RISs. For example, the control node 405 may transmit a first message towards the movable relay node 410 and the one or more RISs may reflect the first message towards the second node 415. Specifically, the control node 405 may identify a transmit beam that corresponds to a location of the movable relay node 410 and may use the identified transmit beam to transmit the first message. Similarly, the movable relay node 410 may relay communications from the second node to the control node at 445. For example, the second node 415 may transmit a second message towards the movable relay node 410 (e.g., using a transmit beam that corresponds to the movable relay node 410) and the one or more RISs may reflect the second message towards the control node 405.

Using the movable relay node 410 to relay communications between the control node 405 and the second node 415 may improve the likelihood of successful communications between the control node 405 and the second node 415. For example, if a LOS channel between the control node 405 and the second node 415 is obstructed by blockage, the movable relay node 410 may provide an alternate channel between the control node 405 and the second node 415. As such, the movable relay node 410 may improve the reliability of communications between the control node 405 and the second node 415, among other benefits.

Figure 5:
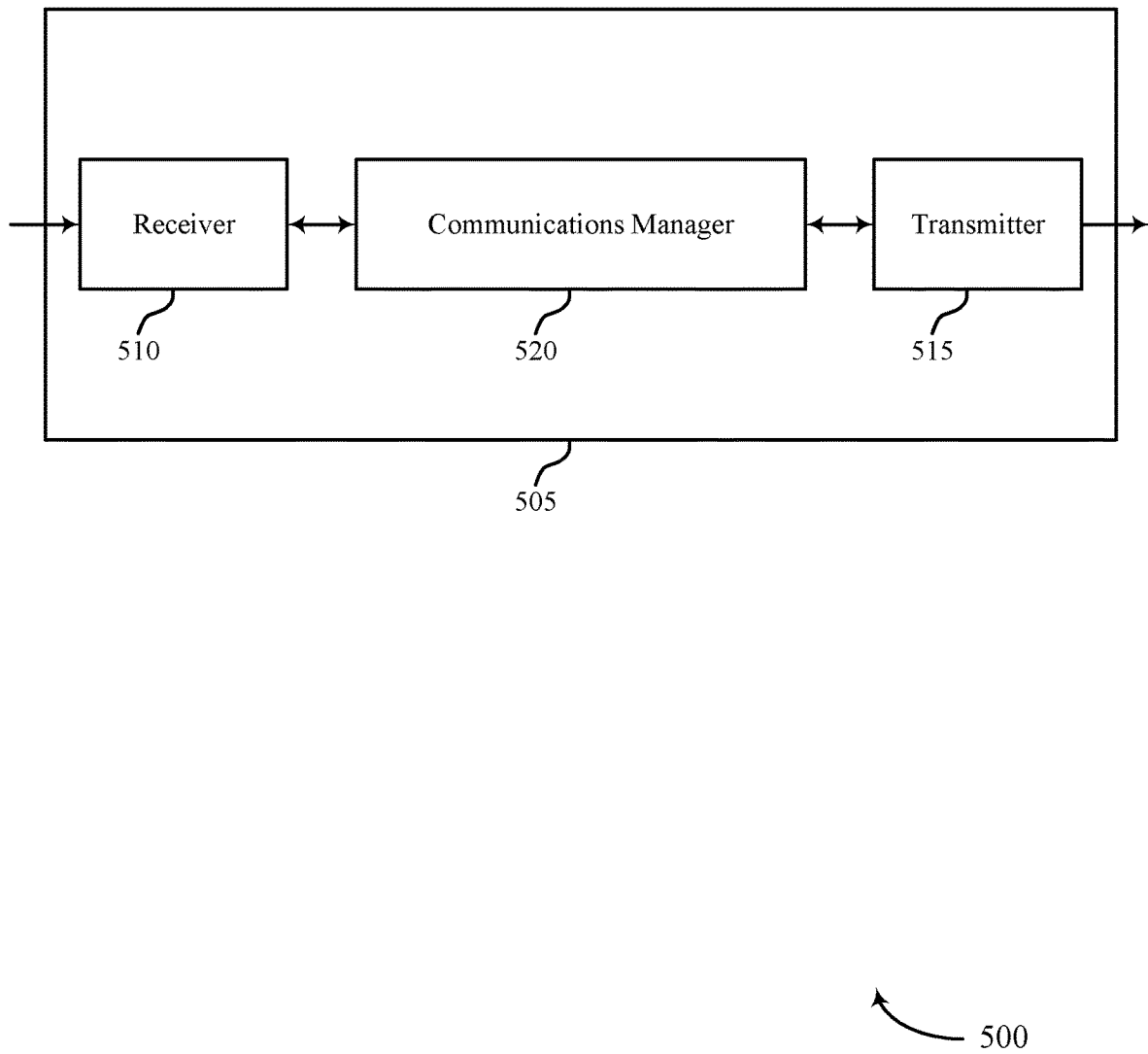
FIGS. 5 and 6 show block diagrams of devices that support reporting techniques for movable relay nodes in accordance with aspects of the present disclosure.

FIG. 5 shows a block diagram 500 of a device 505 that supports reporting techniques for movable relay nodes in accordance with aspects of the present disclosure. The device 505 may be an example of aspects of a control node (e.g., a UE 115 or a base station 105) as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to reporting techniques for movable relay nodes). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to reporting techniques for movable relay nodes). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of reporting techniques for movable relay nodes as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application specific integrated circuit (ASIC), a field programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at the device 505 in accordance with examples as disclosed herein. For example, the communications manager 520 may be configured as or otherwise support a means for receiving, from a movable relay node, a capability message indicating a set of operational parameters for the movable relay node. The communications manager 520 may be configured as or otherwise support a means for transmitting, to the movable relay node at a first location and based on receiving the capability message, a location message indicating a second location for the movable relay node. The communications manager 520 may be configured as or otherwise support a means for communicating with a second node via the movable relay node based on transmitting the location message.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced power consumption based on reducing a number of retransmissions requested by the device 505. For example, the described techniques may enable the device 505 to communicate with a wireless node (e.g., a UE 115 or a base station) via a movable relay node when there is no LOS between the device 505 and the wireless node, which may improve the reliability of communications between the device 505 and the wireless node. As a result, the device 505 may request fewer retransmissions, which may enable the device 505 to remain in a sleep mode for a longer duration.

Figure 6:
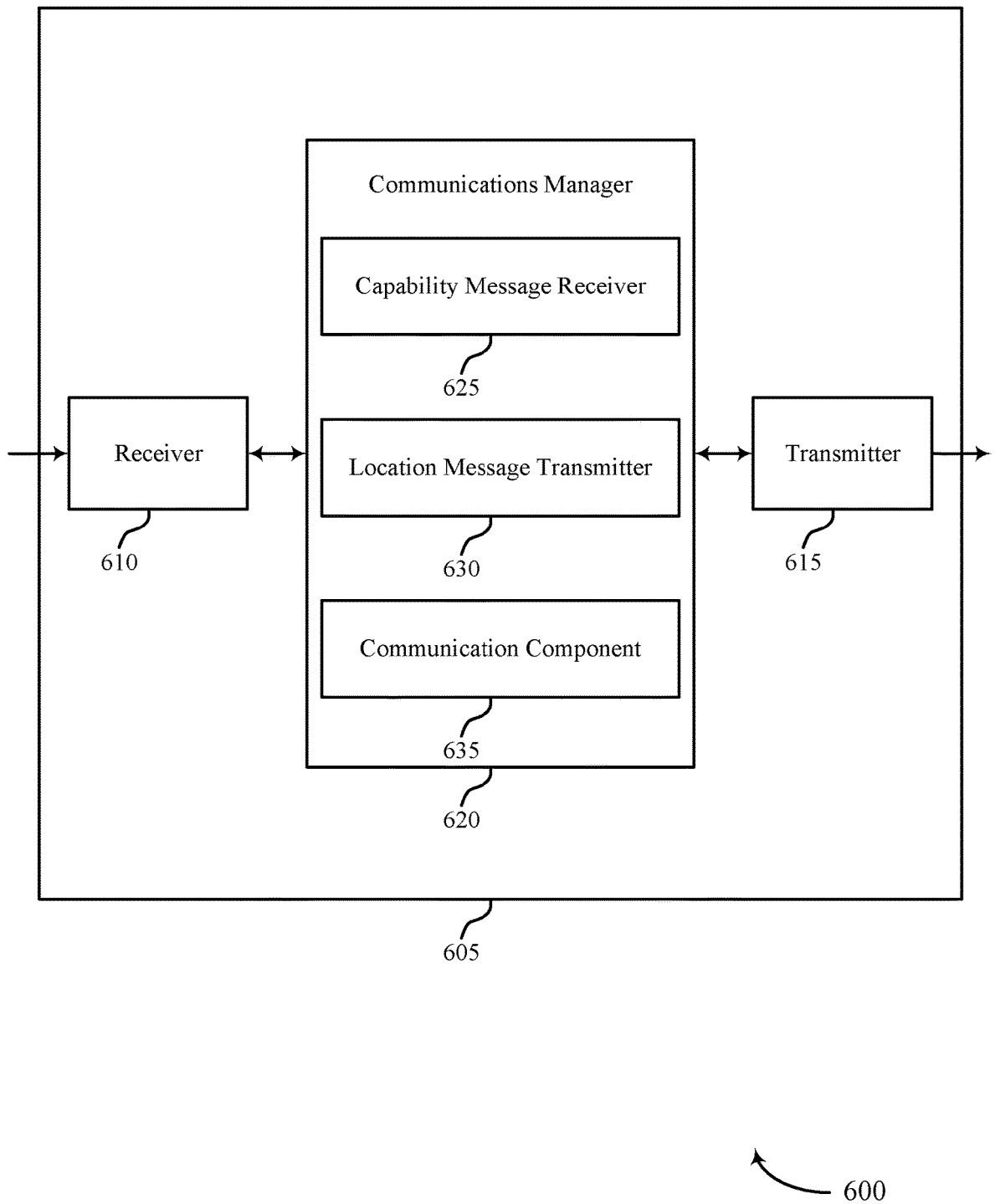

FIG. 6 shows a block diagram 600 of a device 605 that supports reporting techniques for movable relay nodes in accordance with aspects of the present disclosure. The device 605 may be an example of aspects of a device 505 or a control node (e.g., a UE 115 or a base station 105) as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to reporting techniques for movable relay nodes). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to reporting techniques for movable relay nodes). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of reporting techniques for movable relay nodes as described herein. For example, the communications manager 620 may include a capability message receiver 625, a location message transmitter 630, a communication component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at the device 605 in accordance with examples as disclosed herein. The capability message receiver 625 may be configured as or otherwise support a means for receiving, from a movable relay node, a capability message indicating a set of operational parameters for the movable relay node. The location message transmitter 630 may be configured as or otherwise support a means for transmitting, to the movable relay node at a first location and based on receiving the capability message, a location message indicating a second location for the movable relay node. The communication component 635 may be configured as or otherwise support a means for communicating with a second node via the movable relay node based on transmitting the location message.

Figure 7:
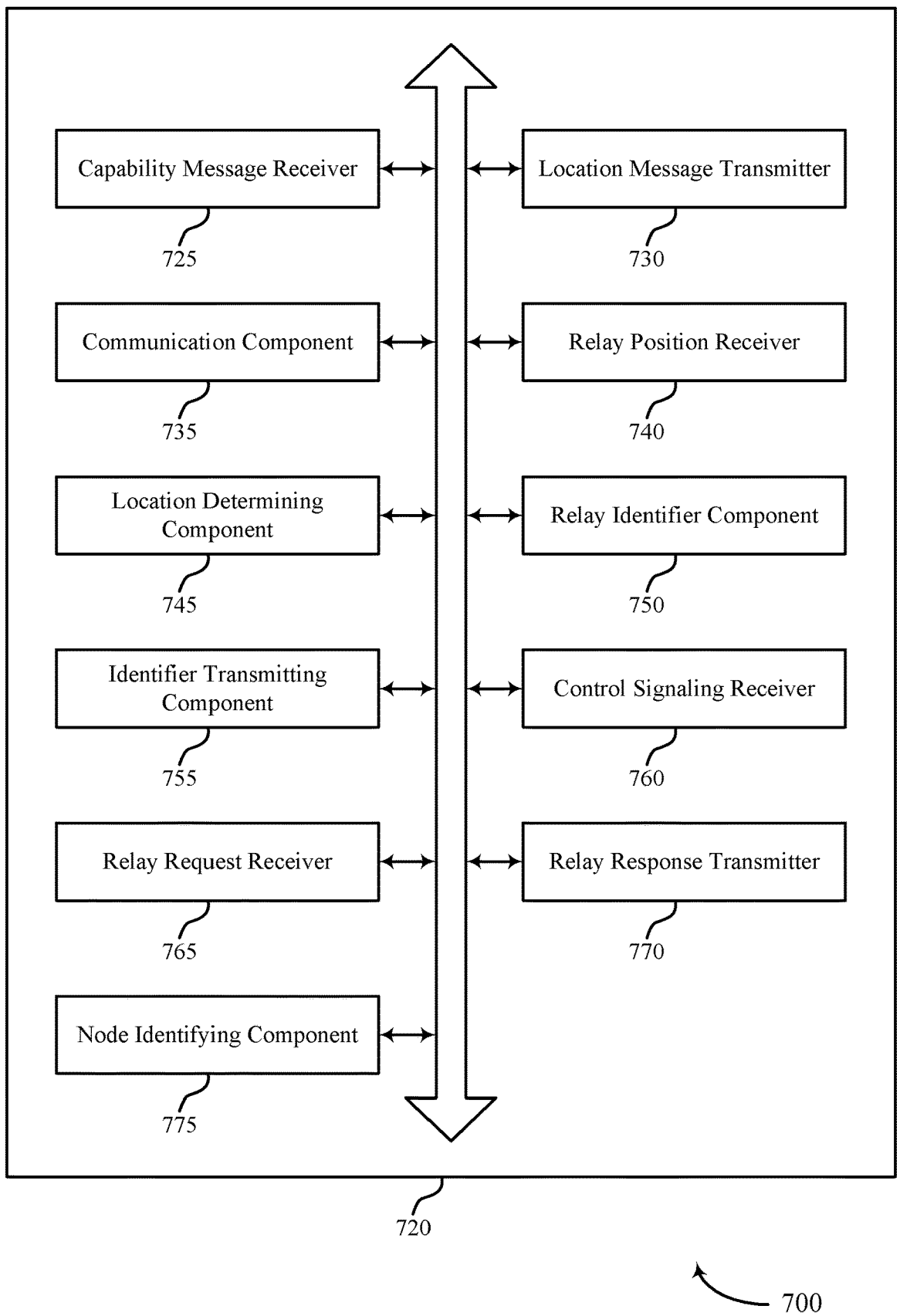
FIG. 7 shows a block diagram of a communications manager that supports reporting techniques for movable relay nodes in accordance with aspects of the present disclosure.

FIG. 7 shows a block diagram 700 of a communications manager 720 that supports reporting techniques for movable relay nodes in accordance with aspects of the present disclosure. The communications manager 720 may be an example of aspects of a communications manager 520, a communications manager 620, or both, as described herein. The communications manager 720, or various components thereof, may be an example of means for performing various aspects of reporting techniques for movable relay nodes as described herein. For example, the communications manager 720 may include a capability message receiver 725, a location message transmitter 730, a communication component 735, a relay position receiver 740, a location determining component 745, a relay identifier component 750, an identifier transmitting component 755, a control signaling receiver 760, a relay request receiver 765, a relay response transmitter 770, a node identifying component 775, or any combination thereof. Each of these components may communicate, directly or indirectly, with one another (e.g., via one or more buses).

The communications manager 720 may support wireless communications at the device 705 in accordance with examples as disclosed herein. The capability message receiver 725 may be configured as or otherwise support a means for receiving, from a movable relay node, a capability message indicating a set of operational parameters for the movable relay node. The location message transmitter 730 may be configured as or otherwise support a means for transmitting, to the movable relay node at a first location and based on receiving the capability message, a location message indicating a second location for the movable relay node. The communication component 735 may be configured as or otherwise support a means for communicating with a second node via the movable relay node based on transmitting the location message.

In some examples, the relay position receiver 740 may be configured as or otherwise support a means for receiving an indication that the movable relay node is positioned at the second location, where communicating with the second node via the movable relay node is further based on receiving the indication.

In some examples, the location message indicates a set of possible locations including the second location, and the relay position receiver 740 may be configured as or otherwise support a means for receiving an indication that the movable relay node is positioned at the second location of the set of possible locations, where communicating with the second node via the movable relay node is further based on receiving the indication.

In some examples, the relay position receiver 740 may be configured as or otherwise support a means for receiving an indication that the movable relay node is unable to be positioned at the second location, where communicating with the second node is further based on receiving the indication.

In some examples, the movable relay node may include one or more UEs, one or more RISs configured to relay signals in a wireless communications network, or a combination thereof. In some examples, the control node includes a base station and the second node includes a UE. In some examples, the control node may include a UE 115 and the second node may include a base station 105. In some examples, the control signaling may include RRC signaling, a MAC-CE, or both. In some examples, the second location includes a location in a global navigation satellite system, an altitude above a reference point, or both.

In some examples, the set of operational parameters indicated by the capability message may include a type of the movable relay node, a quantity of movement dimensions capable by the movable relay node, a maximum speed of the movable relay node, an average speed of the movable relay node, stability information associated the movable relay node, an altitude limit of the movable relay node, a power level of the movable relay node, a battery status of the movable relay node, or a combination thereof. Additionally or alternatively, the set of operational parameters may include a quantity of the one or more UEs, types of the one or more UEs, capabilities of the one or more UEs, sizes of the one or more RISs, path loss values associated with the one or more RISs, frequency ranges supported by the one or more RISs, reflection angles of the one or more RISs with respect to a reference plane, or a combination thereof.

In some examples, the location determining component 745 may be configured as or otherwise support a means for determining a link budget calculation for a wireless channel between the control node and the movable relay node, an MPE value for the control node, image processing data generated by sensors of the control node, an RSRP measurement, an SIR power ratio, an angle between the control node and the movable relay node, a speed message from the movable relay node, or a combination thereof, where transmitting the location message to the movable relay node is based on the determining.

In some examples, the relay identifier component 750 may be configured as or otherwise support a means for receiving, from the movable relay node, a first message indicating an identifier of the movable relay node. In some examples, the identifier transmitting component 755 may be configured as or otherwise support a means for transmitting, to the movable relay node and based on receiving the first message, a second message indicating an identifier of the control node. In some examples, the capability message receiver 725 may be configured as or otherwise support a means for receiving, from the movable relay node and based on transmitting the second message, a sidelink transmission including the capability message, the identifier of the control node, and the identifier of the movable relay node.

In some examples, to support transmitting the location message, the location message transmitter 730 may be configured as or otherwise support a means for transmitting, to the movable relay node, a sidelink transmission including the location message, an identifier of the movable relay node, and an identifier of the control node.

In some examples, the control signaling receiver 760 may be configured as or otherwise support a means for receiving, from the second node, control signaling indicating positions of one or more TRPs associated with the second node, where transmitting the location message to the movable relay node is based on receiving the control signaling from the second node.

In some examples, the location determining component 745 may be configured as or otherwise support a means for determining positions of one or more TRPs associated with the second node based on image processing data generated by one or more sensors of the control node, where transmitting the location message is based on determining the positions of the one or more TRPs.

In some examples, the relay request receiver 765 may be configured as or otherwise support a means for receiving, from the second node, a request for the movable relay node to relay communications between the control node and the second node. In some examples, the relay response transmitter 770 may be configured as or otherwise support a means for transmitting, to the second node and in response to the request for the movable relay node, an indication that the movable relay node is positioned for the second node. In some examples, the indication may include RRC signaling, a MAC-CE, or both.

In some examples, the location determining component 745 may be configured as or otherwise support a means for determining the second location for the movable relay node based on the set of operational parameters, a set of channel measurements, image processing data generated by sensors at the control node, or a combination thereof, where transmitting the location message is based on determining the second location.

Figure 8:
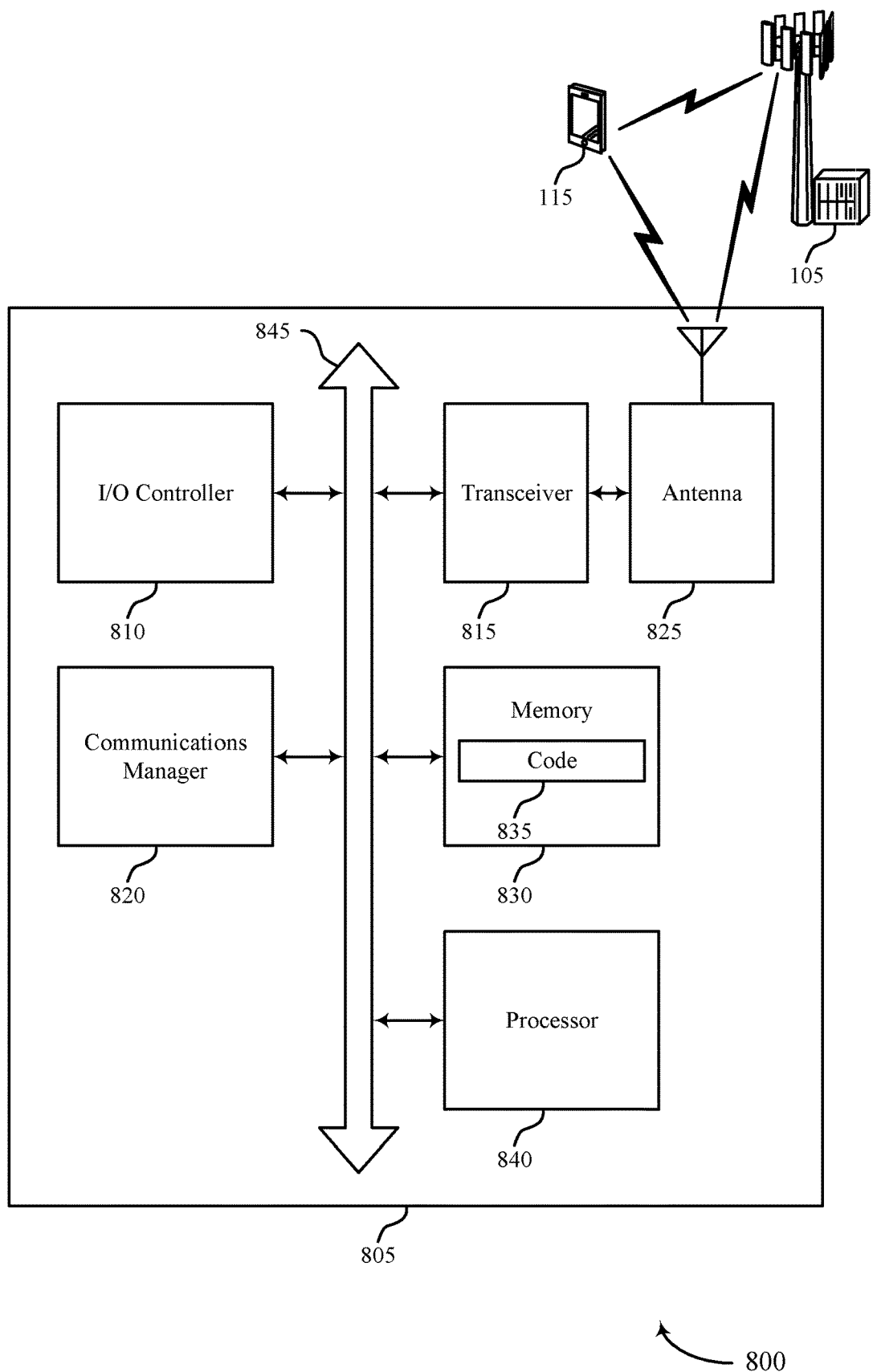
FIG. 8 shows a diagram of a system including a device that supports reporting techniques for movable relay nodes in accordance with aspects of the present disclosure.

FIG. 8 shows a diagram of a system 800 including a device 805 that supports reporting techniques for movable relay nodes in accordance with aspects of the present disclosure. The device 805 may be an example of or include the components of a device 505, a device 605, or a control node (e.g., a UE 115 or a base station 105) as described herein. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and ROM. The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting reporting techniques for movable relay nodes). For example, the device 805 or a component of the device 805 may include a processor 840 and memory 830 coupled to the processor 840, the processor 840 and memory 830 configured to perform various functions described herein.

The communications manager 820 may support wireless communications at the device 805 in accordance with examples as disclosed herein. For example, the communications manager 820 may be configured as or otherwise support a means for receiving, from a movable relay node, a capability message indicating a set of operational parameters for the movable relay node. The communications manager 820 may be configured as or otherwise support a means for transmitting, to the movable relay node at a first location and based on receiving the capability message, a location message indicating a second location for the movable relay node. The communications manager 820 may be configured as or otherwise support a means for communicating with a second node via the movable relay node based on transmitting the location message.

By including or configuring the communications manager 820 in accordance with examples as described herein, the device 805 may support techniques for improved communication reliability based on using a movable relay node to relay communications between the device 805 and a wireless node (e.g., a UE 115 or a base station 105). Specifically, if a LOS channel between the device 805 and the wireless node is blocked or otherwise obstructed, the device 805 may use the movable relay node to communicate with the wireless node via an alternate path, which may improve the reliability of communications between the device 805 and the wireless node.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of reporting techniques for movable relay nodes as described herein, or the processor 840 and the memory 830 may be otherwise configured to perform or support such operations.

Figure 9:
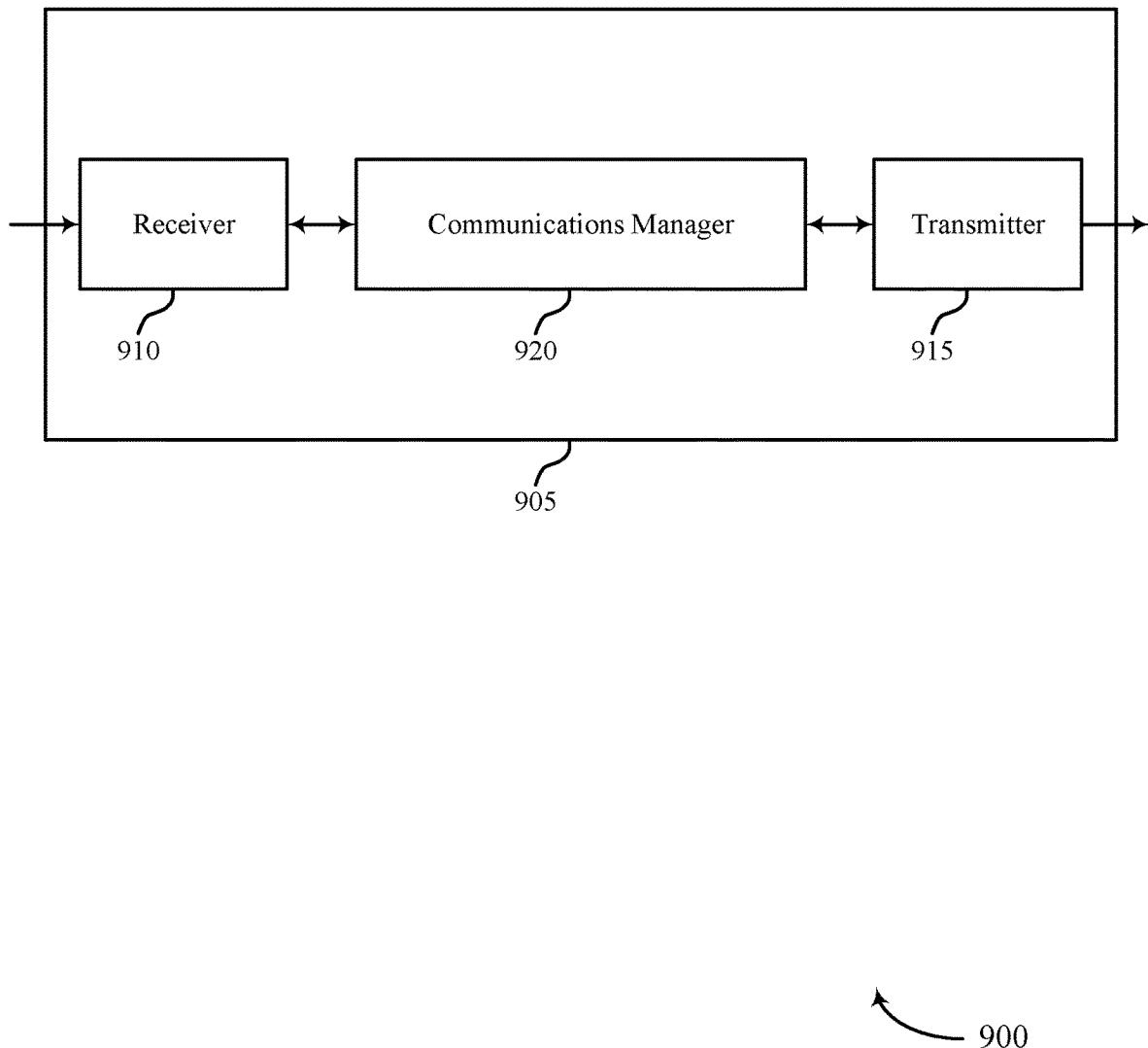
FIGS. 9 and 10 show block diagrams of devices that support reporting techniques for movable relay nodes in accordance with aspects of the present disclosure.

FIG. 9 shows a block diagram 900 of a device 905 that supports reporting techniques for movable relay nodes in accordance with aspects of the present disclosure. The device 905 may be an example of aspects of a movable relay node as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to reporting techniques for movable relay nodes). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to reporting techniques for movable relay nodes). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of reporting techniques for movable relay nodes as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at the device 905 in accordance with examples as disclosed herein. For example, the communications manager 920 may be configured as or otherwise support a means for transmitting, to a control node, a capability message indicating a set of operational parameters for the movable relay node. The communications manager 920 may be configured as or otherwise support a means for receiving, from the control node and based on transmitting the capability message, a location message indicating a first location for the movable relay node. The communications manager 920 may be configured as or otherwise support a means for configuring one or more RISs at the movable relay node based on receiving the location message.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced power consumption at a first wireless node (e.g., a UE 115 or a base station 105) based on reducing a number of retransmissions requested by the first wireless node. For example, the device 905 may relay communications between the first wireless node and a second wireless node when a direct communication link between the first wireless node and the second wireless node is obstructed, which may improve the reliability of communications between the first wireless node and the second wireless node. As a result, the first wireless node may request fewer transmissions, which may enable the first wireless node (and the second wireless node) to remain in a sleep mode for a longer duration.

Figure 10:
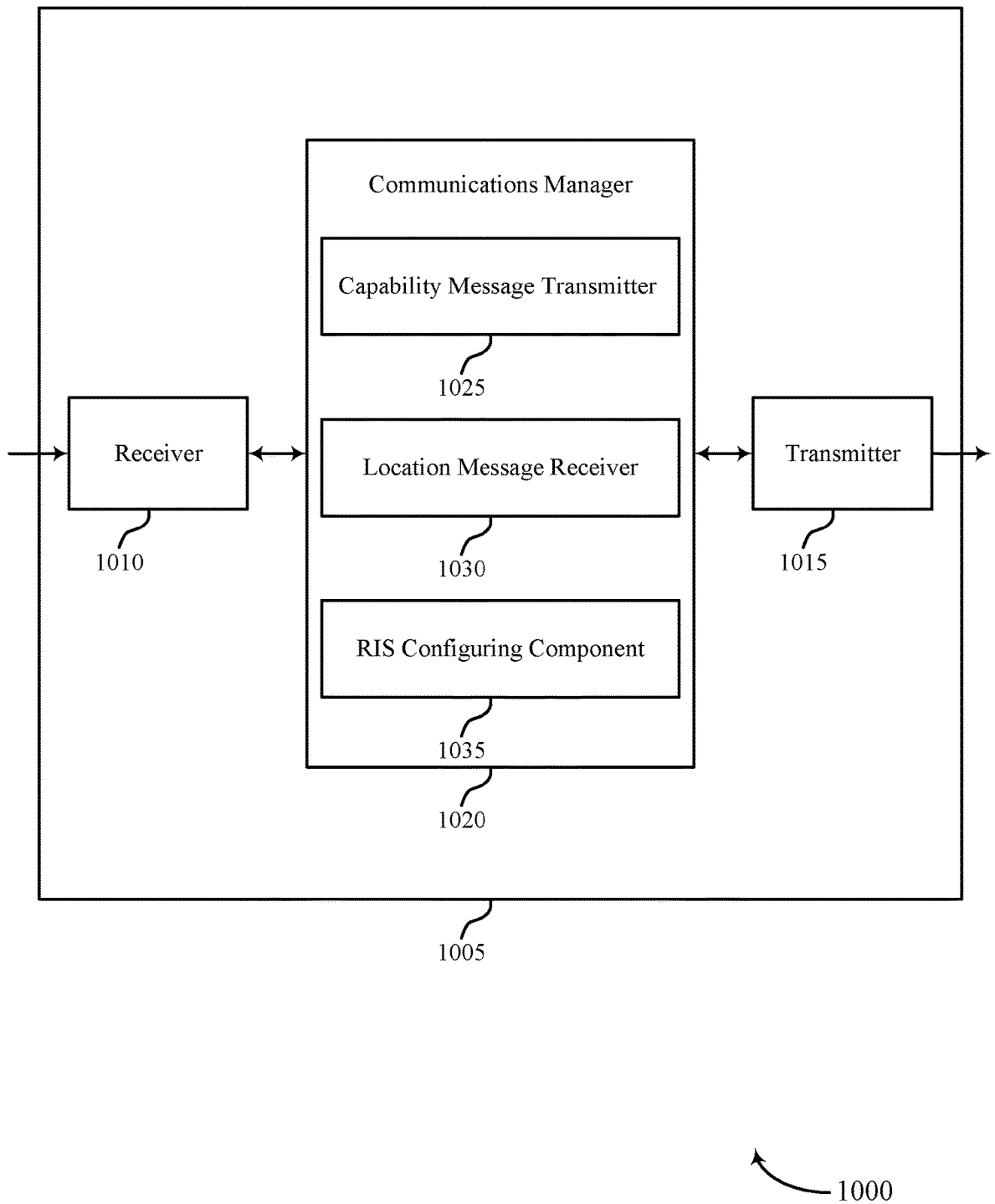

FIG. 10 shows a block diagram 1000 of a device 1005 that supports reporting techniques for movable relay nodes in accordance with aspects of the present disclosure. The device 1005 may be an example of aspects of a device 905 or a movable relay node as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to reporting techniques for movable relay nodes). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to reporting techniques for movable relay nodes). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of reporting techniques for movable relay nodes as described herein. For example, the communications manager 1020 may include a capability message transmitter 1025, a location message receiver 1030, a RIS configuring component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at the device 1005 in accordance with examples as disclosed herein. The capability message transmitter 1025 may be configured as or otherwise support a means for transmitting, to a control node, a capability message indicating a set of operational parameters for the movable relay node. The location message receiver 1030 may be configured as or otherwise support a means for receiving, from the control node and based on transmitting the capability message, a location message indicating a first location for the movable relay node. The RIS configuring component 1035 may be configured as or otherwise support a means for configuring one or more RISs at the movable relay node based on receiving the location message.

Figure 11:
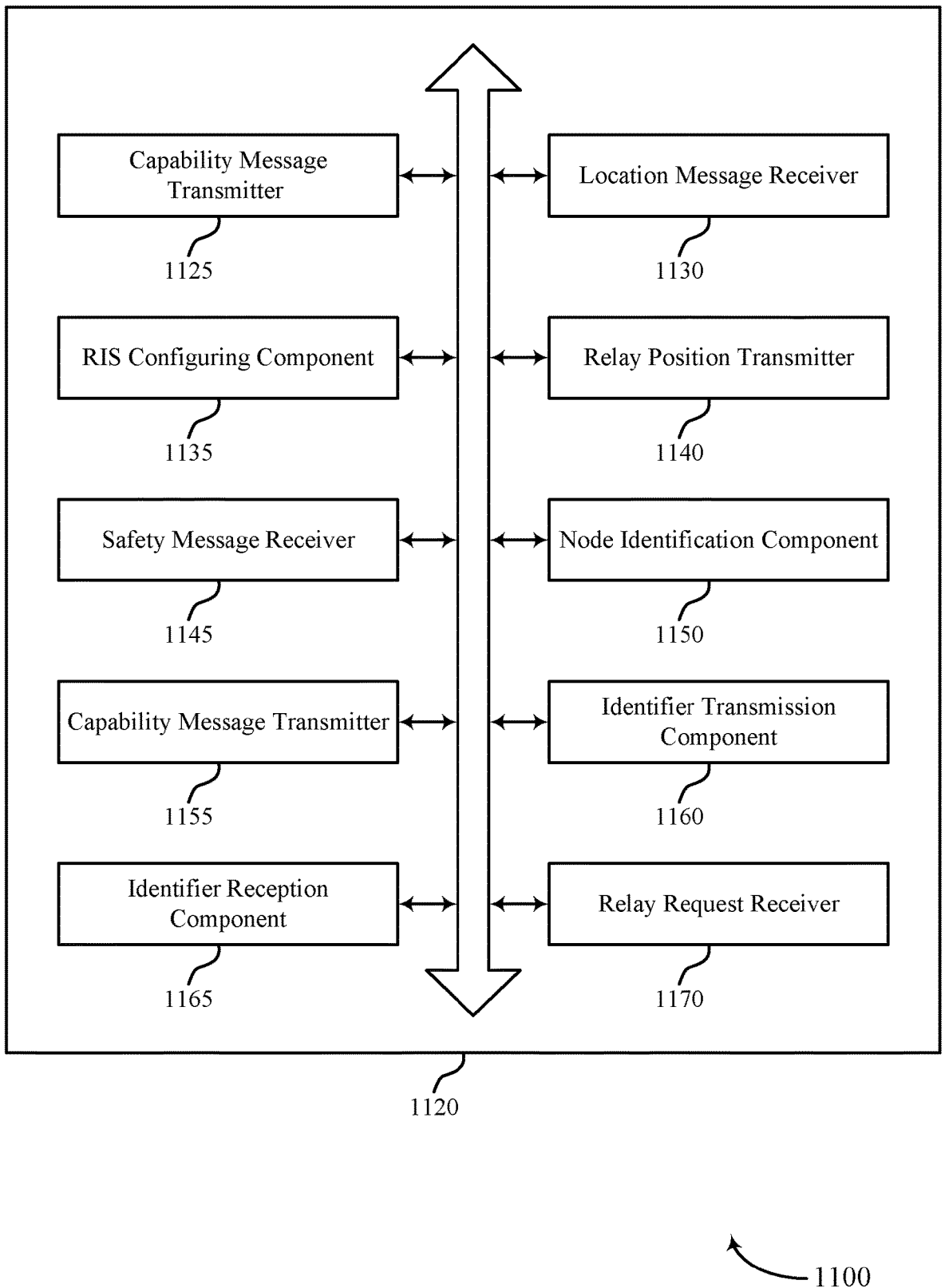
FIG. 11 shows a block diagram of a communications manager that supports reporting techniques for movable relay nodes in accordance with aspects of the present disclosure.

FIG. 11 shows a block diagram 1100 of a communications manager 1120 that supports reporting techniques for movable relay nodes in accordance with aspects of the present disclosure. The communications manager 1120 may be an example of aspects of a communications manager 920, a communications manager 1020, or both, as described herein. The communications manager 1120, or various components thereof, may be an example of means for performing various aspects of reporting techniques for movable relay nodes as described herein. For example, the communications manager 1120 may include a capability message transmitter 1125, a location message receiver 1130, a RIS configuring component 1135, a relay position transmitter 1140, a safety message receiver 1145, a node identification component 1150, a capability message transmitter 1155, an identifier transmission component 1160, an identifier reception component 1165, a relay request receiver 1170, or any combination thereof. Each of these components may communicate, directly or indirectly, with one another (e.g., via one or more buses).

The communications manager 1120 may support wireless communications at the device 1105 in accordance with examples as disclosed herein. The capability message transmitter 1125 may be configured as or otherwise support a means for transmitting, to a control node, a capability message indicating a set of operational parameters for the movable relay node. The location message receiver 1130 may be configured as or otherwise support a means for receiving, from the control node and based on transmitting the capability message, a location message indicating a first location for the movable relay node. The RIS configuring component 1135 may be configured as or otherwise support a means for configuring one or more RISs at the movable relay node based on receiving the location message.

In some examples, the relay position transmitter 1140 may be configured as or otherwise support a means for transmitting, to the control node, an indication that the movable relay node is positioned at the first location, where configuring the one or more RISs at the movable relay node is further based on transmitting the indication.

In some examples, the relay position transmitter 1140 may be configured as or otherwise support a means for transmitting, to the control node, an indication that the movable relay node is unable to be positioned at the first location, where configuring the one or more RISs at the movable relay node is further based on transmitting the indication.

In some examples, the safety message receiver 1145 may be configured as or otherwise support a means for receiving, from a second movable relay node, a sidelink transmission including a safety message, where configuring the one or more RISs at the movable relay node is further based on receiving the sidelink transmission from the second movable relay node.

In some examples, the set of operational parameters indicated by the capability message includes a type of the movable relay node, a quantity of movement dimensions capable by the movable relay node, a maximum speed of the movable relay node, an average speed of the movable relay node, stability information associated the movable relay node, an altitude limit of the movable relay node, a power level of the movable relay node, a battery status of the movable relay node, or a combination thereof.

In some examples, the movable relay node may include one or more UEs. In some examples, the set of operational parameters may include a quantity of the one or more UEs, types of the one or more UEs, capabilities of the one or more UEs, sizes of the one or more RISs, path loss values associated with the one or more RISs, frequency ranges supported by the one or more RISs, reflection angles of the one or more RISs with respect to a reference plane, or a combination thereof.

In some examples, the identifier transmission component 1160 may be configured as or otherwise support a means for transmitting a first message indicating an identifier of the movable relay node. In some examples, the identifier reception component 1165 may be configured as or otherwise support a means for receiving, from the control node and based on transmitting the first message, a second message indicating an identifier of the control node. In some examples, the capability message transmitter 1155 may be configured as or otherwise support a means for transmitting, to the control node and based on receiving the second message, a sidelink transmission including the capability message, the identifier of the movable relay node, and the identifier of the control node.

In some examples, to support receiving the location message, the location message receiver 1130 may be configured as or otherwise support a means for receiving, from the control node, a sidelink transmission including the location message, an identifier of the movable relay node, and an identifier of the control node.

In some examples, the relay request receiver 1170 may be configured as or otherwise support a means for receiving, from the control node, a request to relay communications between the control node and a second node, where configuring the one or more RISs at the movable relay node is based on receiving the request.

Figure 12:
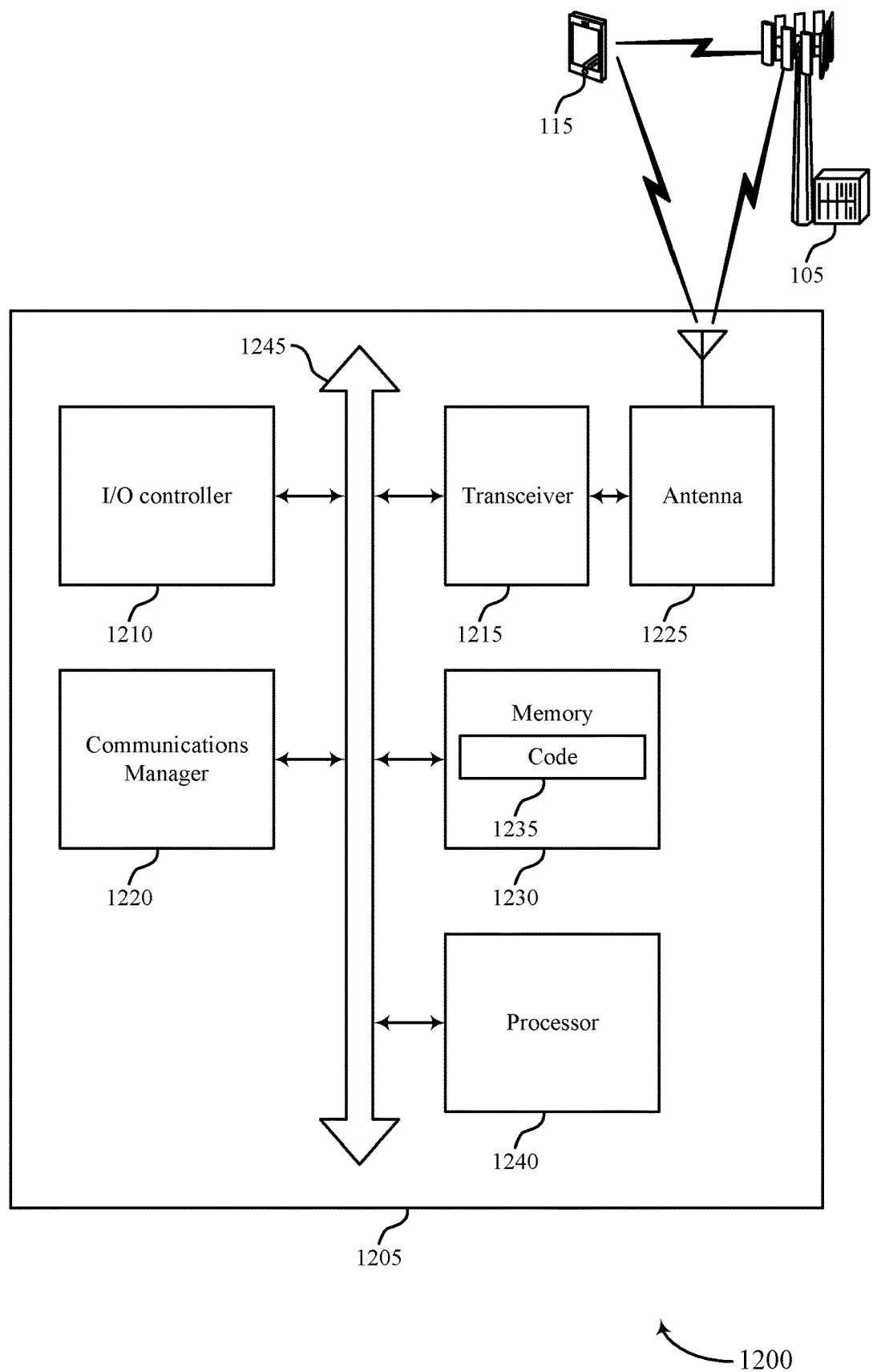
FIG. 12 shows a diagram of a system including a device that supports reporting techniques for movable relay nodes in accordance with aspects of the present disclosure.

FIG. 12 shows a diagram of a system 1200 including a device 1205 that supports reporting techniques for movable relay nodes in accordance with aspects of the present disclosure. The device 1205 may be an example of or include the components of a device 905, a device 1005, or a movable relay node as described herein. The device 1205 may include components for bi-directional voice and data communications including components for transmitting and receiving communications, such as a communications manager 1220, a network communications manager 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting reporting techniques for movable relay nodes). For example, the device 1205 or a component of the device 1205 may include a processor 1240 and memory 1230 coupled to the processor 1240, the processor 1240 and memory 1230 configured to perform various functions described herein.

The communications manager 1220 may support wireless communications at a movable relay node in accordance with examples as disclosed herein. For example, the communications manager 1220 may be configured as or otherwise support a means for transmitting, to a control node, a capability message indicating a set of operational parameters for the movable relay node. The communications manager 1220 may be configured as or otherwise support a means for receiving, from the control node and based on transmitting the capability message, a location message indicating a first location for the movable relay node. The communications manager 1220 may be configured as or otherwise support a means for configuring one or more RISs at the movable relay node based on receiving the location message.

By including or configuring the communications manager 1220 in accordance with examples as described herein, the device 1205 may support techniques for improved communication reliability based on relaying communications between a first wireless node (e.g., a UE 115 or a base station 105) and a second wireless node (e.g., a UE 115 or a base station 105). For example, if the first wireless node is unable to communicate with the second wireless node via a LOS channel, the first wireless node may communicate with the second wireless node via the device 1205 (e.g., the device 1205 may relay communications between the first wireless node and the second wireless node), which may improve the reliability of communications between the first wireless node and the second wireless node.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of reporting techniques for movable relay nodes as described herein, or the processor 1240 and the memory 1230 may be otherwise configured to perform or support such operations.

Figure 13:
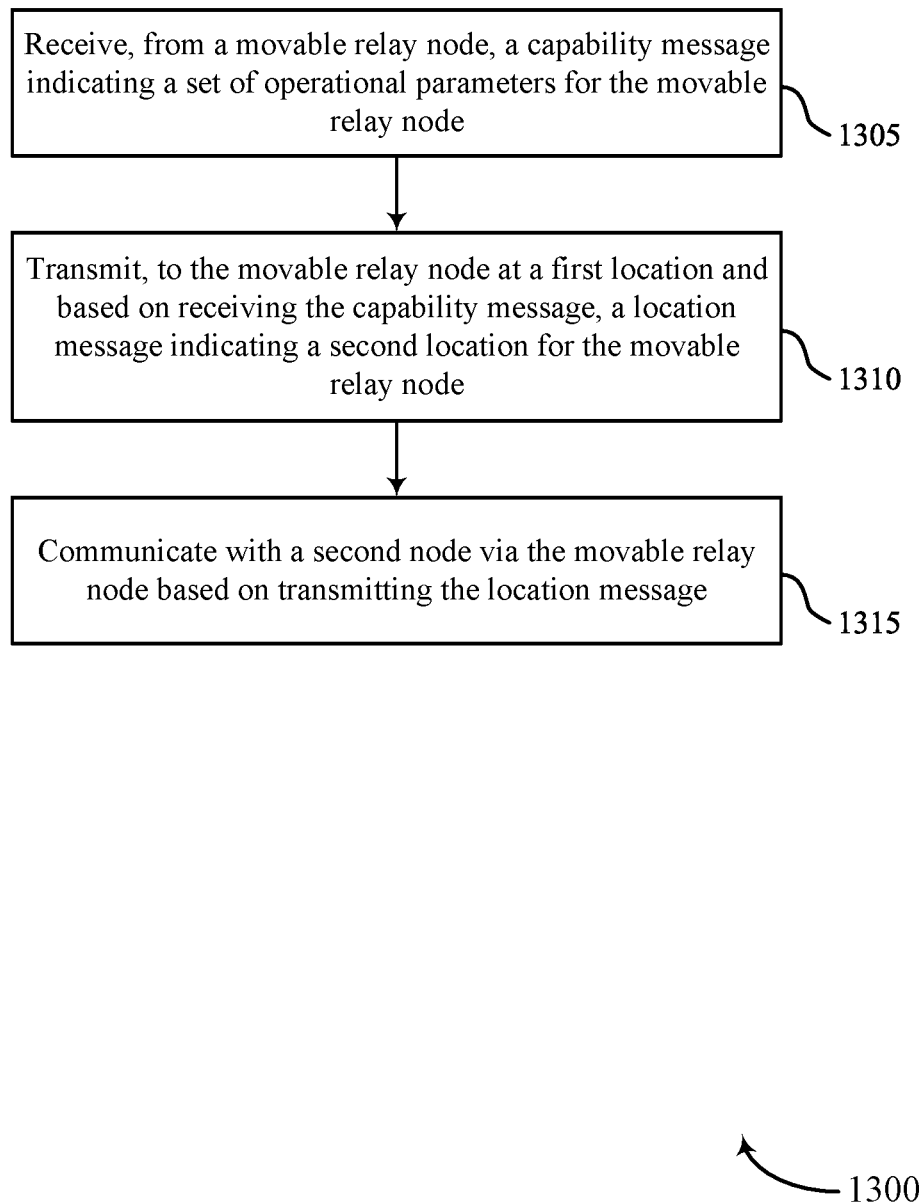
FIGS. 13-16 show flowcharts illustrating methods that support reporting techniques for movable relay nodes in accordance with aspects of the present disclosure.

FIG. 13 shows a flowchart illustrating a method 1300 that supports reporting techniques for movable relay nodes in accordance with aspects of the present disclosure. The operations of the method 1300 may be implemented by a control node (e.g., a UE 115 or a base station 105) or its components as described herein. For example, the operations of the method 1300 may be performed by a control node as described with reference to FIGS. 1 through 8. In some examples, a control node may execute a set of instructions to control the functional elements of the control node to perform the described functions. Additionally or alternatively, the control node may perform aspects of the described functions using special-purpose hardware.

At 1305, the method may include receiving, from a movable relay node, a capability message indicating a set of operational parameters for the movable relay node. The operations of 1305 may be performed in accordance with examples as disclosed herein. In some examples, aspects of the operations of 1305 may be performed by a capability message receiver 725 as described with reference to FIG. 7.

At 1310, the method may include transmitting, to the movable relay node at a first location and based on receiving the capability message, a location message indicating a second location for the movable relay node. The operations of 1310 may be performed in accordance with examples as disclosed herein. In some examples, aspects of the operations of 1310 may be performed by a location message transmitter 730 as described with reference to FIG. 7.

At 1315, the method may include communicating with a second node via the movable relay node based on transmitting the location message. The operations of 1315 may be performed in accordance with examples as disclosed herein. In some examples, aspects of the operations of 1315 may be performed by a communication component 735 as described with reference to FIG. 7.

Figure 14:
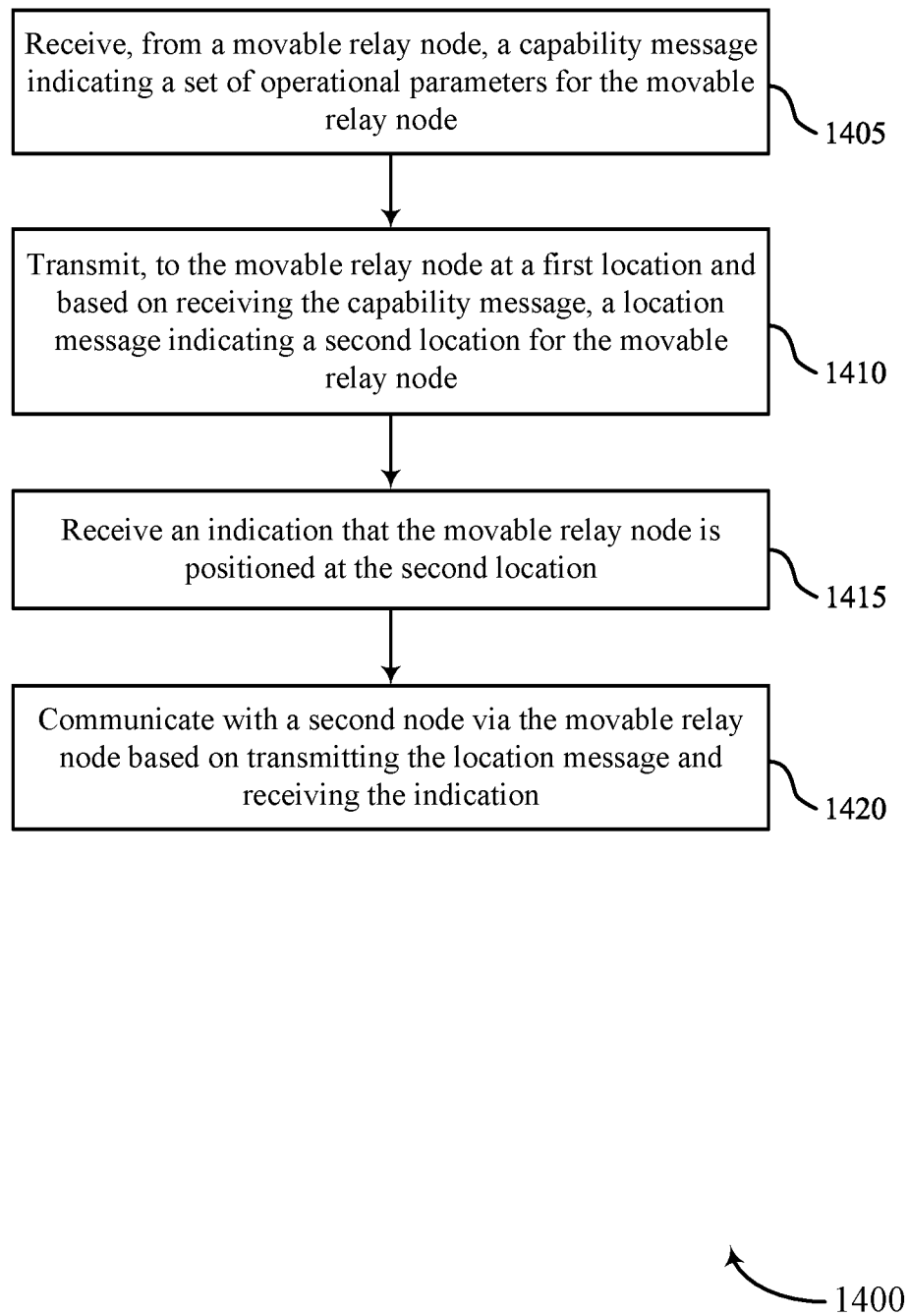

FIG. 14 shows a flowchart illustrating a method 1400 that supports reporting techniques for movable relay nodes in accordance with aspects of the present disclosure. The operations of the method 1400 may be implemented by a control node (e.g., a UE 115 or a base station 105) or its components as described herein. For example, the operations of the method 1400 may be performed by a control node as described with reference to FIGS. 1 through 8. In some examples, a control node may execute a set of instructions to control the functional elements of the control node to perform the described functions. Additionally or alternatively, the control node may perform aspects of the described functions using special-purpose hardware.

At 1405, the method may include receiving, from a movable relay node, a capability message indicating a set of operational parameters for the movable relay node. The operations of 1405 may be performed in accordance with examples as disclosed herein. In some examples, aspects of the operations of 1405 may be performed by a capability message receiver 725 as described with reference to FIG. 7.

At 1410, the method may include transmitting, to the movable relay node at a first location and based on receiving the capability message, a location message indicating a second location for the movable relay node. The operations of 1410 may be performed in accordance with examples as disclosed herein. In some examples, aspects of the operations of 1410 may be performed by a location message transmitter 730 as described with reference to FIG. 7.

At 1415, the method may include receiving an indication that the movable relay node is positioned at the second location, where communicating with the second node via the movable relay node is further based on receiving the indication. The operations of 1415 may be performed in accordance with examples as disclosed herein. In some examples, aspects of the operations of 1415 may be performed by a relay position receiver 740 as described with reference to FIG. 7.

At 1420, the method may include communicating with a second node via the movable relay node based on transmitting the location message. The operations of 1420 may be performed in accordance with examples as disclosed herein. In some examples, aspects of the operations of 1420 may be performed by a communication component 735 as described with reference to FIG. 7.

Figure 15:
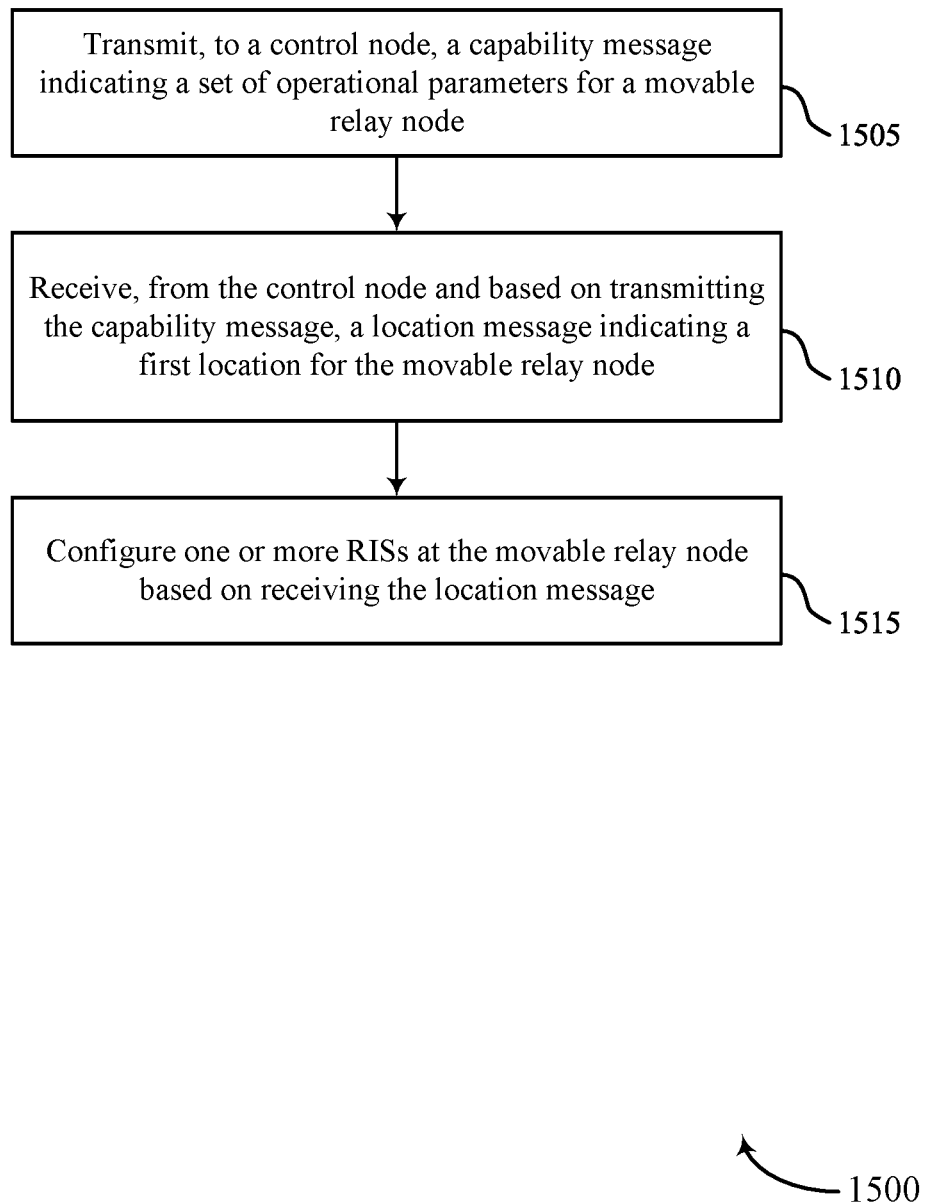

FIG. 15 shows a flowchart illustrating a method 1500 that supports reporting techniques for movable relay nodes in accordance with aspects of the present disclosure. The operations of the method 1500 may be implemented by a movable relay node or its components as described herein. For example, the operations of the method 1500 may be performed by a movable relay node as described with reference to FIGS. 1 through 4 and 9 through 12. In some examples, a movable relay node may execute a set of instructions to control the functional elements of the movable relay node to perform the described functions. Additionally or alternatively, the movable relay node may perform aspects of the described functions using special-purpose hardware.

At 1505, the method may include transmitting, to a control node, a capability message indicating a set of operational parameters for the movable relay node. The operations of 1505 may be performed in accordance with examples as disclosed herein. In some examples, aspects of the operations of 1505 may be performed by a capability message transmitter 1125 as described with reference to FIG. 11.

At 1510, the method may include receiving, from the control node and based on transmitting the capability message, a location message indicating a first location for the movable relay node. The operations of 1510 may be performed in accordance with examples as disclosed herein. In some examples, aspects of the operations of 1510 may be performed by a location message receiver 1130 as described with reference to FIG. 11.

At 1515, the method may include configuring one or more RISs at the movable relay node based on receiving the location message. The operations of 1515 may be performed in accordance with examples as disclosed herein. In some examples, aspects of the operations of 1515 may be performed by a RIS configuring component 1135 as described with reference to FIG. 11.

Figure 16:
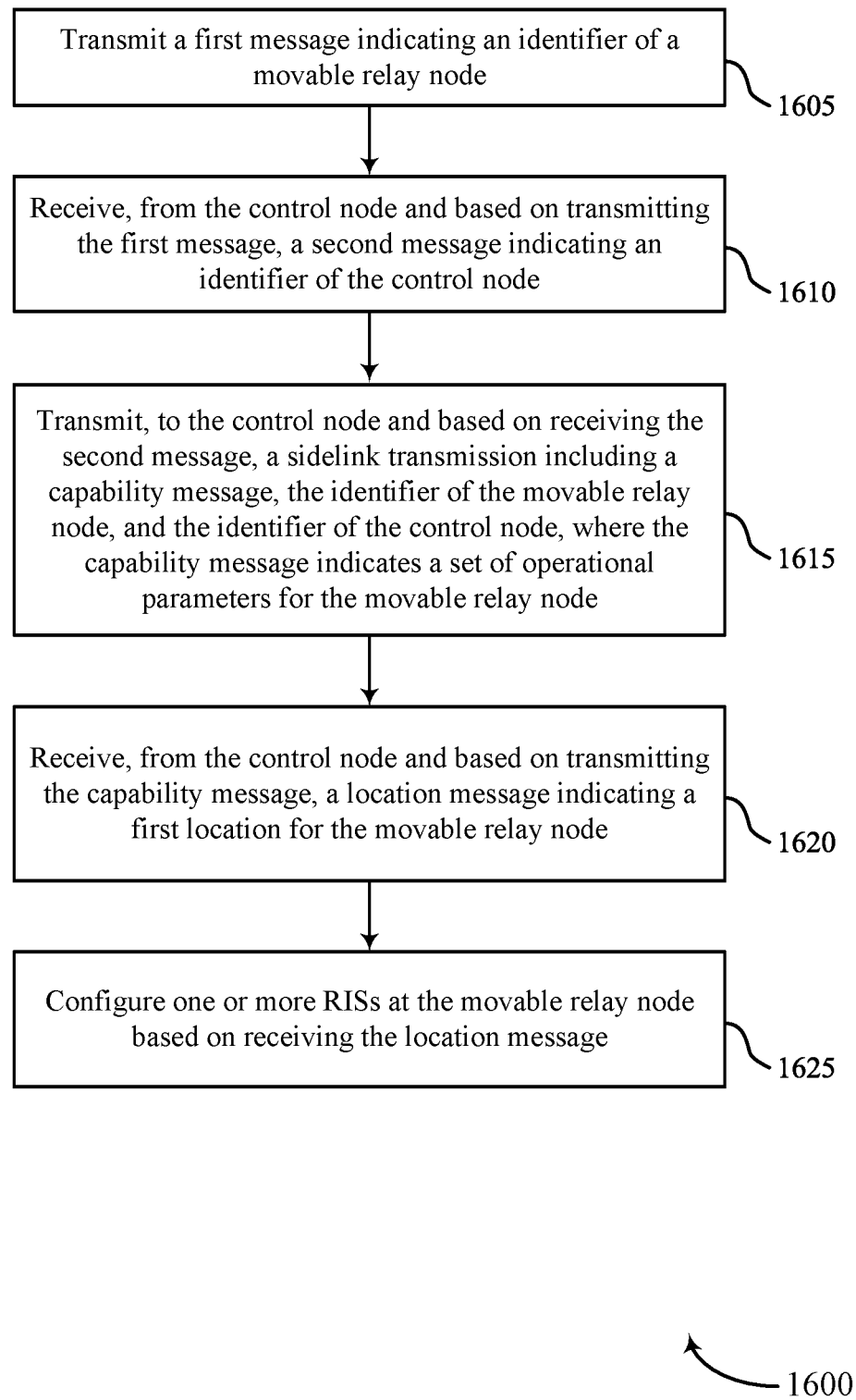

FIG. 16 shows a flowchart illustrating a method 1600 that supports reporting techniques for movable relay nodes in accordance with aspects of the present disclosure. The operations of the method 1600 may be implemented by a movable relay node or its components as described herein. For example, the operations of the method 1600 may be performed by a movable relay node as described with reference to FIGS. 1 through 4 and 9 through 12. In some examples, a movable relay node may execute a set of instructions to control the functional elements of the movable relay node to perform the described functions. Additionally or alternatively, the movable relay node may perform aspects of the described functions using special-purpose hardware.

At 1605, the method may include transmitting a first message indicating an identifier of the movable relay node. The operations of 1605 may be performed in accordance with examples as disclosed herein. In some examples, aspects of the operations of 1605 may be performed by an identifier transmission component 1160 as described with reference to FIG. 11.

At 1610, the method may include receiving, from the control node and based on transmitting the first message, a second message indicating an identifier of the control node. The operations of 1610 may be performed in accordance with examples as disclosed herein. In some examples, aspects of the operations of 1610 may be performed by an identifier reception component 1165 as described with reference to FIG. 11.

At 1615, the method may include transmitting, to the control node and based on receiving the second message, a sidelink transmission including a capability message, the identifier of the movable relay node, and the identifier of the control node, where the capability message indicates a set of operational parameters for the movable relay node. The operations of 1615 may be performed in accordance with examples as disclosed herein. In some examples, aspects of the operations of 1615 may be performed by a capability message transmitter 1155 as described with reference to FIG. 11.

At 1620, the method may include receiving, from the control node and based on transmitting the capability message, a location message indicating a first location for the movable relay node. The operations of 1620 may be performed in accordance with examples as disclosed herein. In some examples, aspects of the operations of 1620 may be performed by a location message receiver 1130 as described with reference to FIG. 11.

At 1625, the method may include configuring one or more RISs at the movable relay node based on receiving the location message. The operations of 1625 may be performed in accordance with examples as disclosed herein. In some examples, aspects of the operations of 1625 may be performed by a RIS configuring component 1135 as described with reference to FIG. 11.

The following provides an overview of aspects of the present disclosure:

Aspect 1: A method for wireless communications at a control node, comprising: receiving, from a movable relay node, a capability message indicating a set of operational parameters for the movable relay node; transmitting, to the movable relay node at a first location and based at least in part on receiving the capability message, a location message indicating a second location for the movable relay node; and communicating with a second node via the movable relay node based at least in part on transmitting the location message.

Aspect 2: The method of aspect 1, further comprising: receiving an indication that the movable relay node is positioned at the second location, wherein communicating with the second node via the movable relay node is further based at least in part on receiving the indication.

Aspect 3: The method of any of aspects 1 through 2, wherein the location message indicates a set of possible locations comprising the second location, the method further comprising: receiving an indication that the movable relay node is positioned at the second location of the set of possible locations, wherein communicating with the second node via the movable relay node is further based at least in part on receiving the indication.

Aspect 4: The method of aspect 1, further comprising: receiving an indication that the movable relay node is unable to be positioned at the second location, wherein communicating with the second node is further based at least in part on receiving the indication.

Aspect 5: The method of any of aspects 1 through 4, wherein the set of operational parameters indicated by the capability message comprises a type of the movable relay node, a quantity of movement dimensions capable by the movable relay node, a maximum speed of the movable relay node, an average speed of the movable relay node, stability information associated the movable relay node, an altitude limit of the movable relay node, a power level of the movable relay node, a battery status of the movable relay node, or a combination thereof.

Aspect 6: The method of any of aspects 1 through 5, wherein the movable relay node comprises one or more UEs, one or more reconfigurable intelligent surfaces configured to relay signals in a wireless communications network, or a combination thereof.

Aspect 7: The method of aspect 6, wherein the set of operational parameters comprises a quantity of the one or more UEs, types of the one or more UEs, capabilities of the one or more UEs, sizes of the one or more reconfigurable intelligent surfaces, path loss values associated with the one or more reconfigurable intelligent surfaces, frequency ranges supported by the one or more reconfigurable intelligent surfaces, reflection angles of the one or more reconfigurable intelligent surfaces with respect to a reference plane, or a combination thereof.

Aspect 8: The method of any of aspects 1 through 7, further comprising: determining a link budget calculation for a wireless channel between the control node and the movable relay node, a maximum permissible exposure value for the control node, image processing data generated by sensors of the control node, a reference signal received power measurement, a signal to interference power ratio, an angle between the control node and the movable relay node, a speed message from the movable relay node, or a combination thereof, wherein transmitting the location message to the movable relay node is based at least in part on the determining.

Aspect 9: The method of any of aspects 1 through 8, further comprising: receiving, from the movable relay node, a first message indicating an identifier of the movable relay node; transmitting, to the movable relay node and based at least in part on receiving the first message, a second message indicating an identifier of the control node; and receiving, from the movable relay node and based at least in part on transmitting the second message, a sidelink transmission comprising the capability message, the identifier of the control node, and the identifier of the movable relay node.

Aspect 10: The method of any of aspects 1 through 9, wherein transmitting the location message comprises: transmitting, to the movable relay node, a sidelink transmission comprising the location message, an identifier of the movable relay node, and an identifier of the control node.

Aspect 11: The method of any of aspects 1 through 10, further comprising: receiving, from the second node, control signaling indicating positions of one or more transmission and reception points associated with the second node, wherein transmitting the location message to the movable relay node is based at least in part on receiving the control signaling from the second node.

Aspect 12: The method of aspect 11, wherein the control node comprises a UE and the second node comprises a base station; and the control signaling comprises a radio resource control message, a medium access control element, or both.

Aspect 13: The method of any of aspects 1 through 12, further comprising: determining positions of one or more transmission and reception points associated with the second node based at least in part on image processing data generated by one or more sensors of the control node, wherein transmitting the location message is based at least in part on determining the positions of the one or more transmission and reception points.

Aspect 14: The method of any of aspects 1 through 13, further comprising: receiving, from the second node, a request for the movable relay node to relay communications between the control node and the second node; transmitting, to the second node and in response to the request for the movable relay node, an indication that the movable relay node is positioned for the second node.

Aspect 15: The method of aspect 14, wherein the control node comprises a base station and the second node comprises a UE; and the indication comprises a radio resource control message, a medium access control element, or both.

Aspect 16: The method of any of aspects 1 through 15, wherein the second location comprises a location in a global navigation satellite system, an altitude above a reference point, or both.

Aspect 17: The method of any of aspects 1 through 16, further comprising: determining the second location for the movable relay node based at least in part on the set of operational parameters, a set of channel measurements, image processing data generated by sensors at the control node, or a combination thereof, wherein transmitting the location message is based at least in part on determining the second location.

Aspect 18: A method for wireless communications at a movable relay node, comprising: transmitting, to a control node, a capability message indicating a set of operational parameters for the movable relay node; receiving, from the control node and based at least in part on transmitting the capability message, a location message indicating a first location for the movable relay node; and configuring one or more reconfigurable intelligent surfaces at the movable relay node based at least in part on receiving the location message.

Aspect 19: The method of aspect 18, further comprising: transmitting, to the control node, an indication that the movable relay node is positioned at the first location, wherein configuring the one or more reconfigurable intelligent surfaces at the movable relay node is further based at least in part on transmitting the indication.

Aspect 20: The method of aspect 18, further comprising: transmitting, to the control node, an indication that the movable relay node is unable to be positioned at the first location, wherein configuring the one or more reconfigurable intelligent surfaces at the movable relay node is further based at least in part on transmitting the indication.

Aspect 21: The method of any of aspects 18 through 20, further comprising: receiving, from a second movable relay node, a sidelink transmission comprising a safety message, wherein configuring the one or more reconfigurable intelligent surfaces at the movable relay node is further based at least in part on receiving the sidelink transmission from the second movable relay node.

Aspect 22: The method of any of aspects 18 through 21, wherein the set of operational parameters indicated by the capability message comprises a type of the movable relay node, a quantity of movement dimensions capable by the movable relay node, a maximum speed of the movable relay node, an average speed of the movable relay node, stability information associated the movable relay node, an altitude limit of the movable relay node, a power level of the movable relay node, a battery status of the movable relay node, or a combination thereof.

Aspect 23: The method of any of aspects 18 through 22, wherein the movable relay node comprises one or more UEs; and the set of operational parameters comprises a quantity of the one or more UEs, types of the one or more UEs, capabilities of the one or more UEs, sizes of the one or more reconfigurable intelligent surfaces, path loss values associated with the one or more reconfigurable intelligent surfaces, frequency ranges supported by the one or more reconfigurable intelligent surfaces, reflection angles of the one or more reconfigurable intelligent surfaces with respect to a reference plane, or a combination thereof.

Aspect 24: The method of any of aspects 18 through 23, further comprising: transmitting a first message indicating an identifier of the movable relay node; receiving, from the control node and based at least in part on transmitting the first message, a second message indicating an identifier of the control node; and transmitting, to the control node and based at least in part on receiving the second message, a sidelink transmission comprising the capability message, the identifier of the movable relay node, and the identifier of the control node.

Aspect 25: The method of any of aspects 18 through 24, wherein receiving the location message comprises: receiving, from the control node, a sidelink transmission comprising the location message, an identifier of the movable relay node, and an identifier of the control node.

Aspect 26: The method of any of aspects 18 through 25, further comprising: receiving, from the control node, a request to relay communications between the control node and a second node, wherein configuring the one or more reconfigurable intelligent surfaces at the movable relay node is based at least in part on receiving the request.

Aspect 27: An apparatus for wireless communications at a control node, comprising a processor; memory coupled with the processor; and instructions stored in the memory and executable by the processor to cause the apparatus to perform a method of any of aspects 1 through 17.

Aspect 28: An apparatus for wireless communications at a control node, comprising at least one means for performing a method of any of aspects 1 through 17.

Aspect 29: A non-transitory computer-readable medium storing code for wireless communications at a control node, the code comprising instructions executable by a processor to perform a method of any of aspects 1 through 17.

Aspect 30: An apparatus for wireless communications at a movable relay node, comprising a processor; memory coupled with the processor; and instructions stored in the memory and executable by the processor to cause the apparatus to perform a method of any of aspects 18 through 26.

Aspect 31: An apparatus for wireless communications at a movable relay node, comprising at least one means for performing a method of any of aspects 18 through 26.

Aspect 32: A non-transitory computer-readable medium storing code for wireless communications at a movable relay node, the code comprising instructions executable by a processor to perform a method of any of aspects 18 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a control node, comprising:
    receiving, from a movable relay node, a capability message indicating a set of operational parameters for the movable relay node, wherein the set of operational parameters comprise at least capability information associated with one or more reconfigurable intelligent surfaces;
    transmitting, to the movable relay node at a first location and based at least in part on receiving the capability message, a location message indicating a second location for the movable relay node, an identifier of the movable relay node, and an identifier of the control node, wherein the location message is transmitted via a sidelink transmission; and
    communicating with a second node via the movable relay node based at least in part on transmitting the location message.

2. The method of claim 1, further comprising:
    receiving an indication that the movable relay node is positioned at the second location, wherein communicating with the second node via the movable relay node is further based at least in part on receiving the indication.

3. The method of claim 1, wherein the location message indicates a set of possible locations comprising the second location, the method further comprising:
    receiving an indication that the movable relay node is positioned at the second location of the set of possible locations, wherein communicating with the second node via the movable relay node is further based at least in part on receiving the indication.

4. The method of claim 1, further comprising:
receiving an indication that the movable relay node is unable to be positioned at the second location, wherein communicating with the second node is further based at least in part on receiving the indication.

5. The method of claim 1, wherein the set of operational parameters indicated by the capability message further comprise a type of the movable relay node, a quantity of movement dimensions capable by the movable relay node, a maximum speed of the movable relay node, an average speed of the movable relay node, stability information associated the movable relay node, an altitude limit of the movable relay node, a power level of the movable relay node, a battery status of the movable relay node, or a combination thereof.

6. The method of claim 1, wherein the movable relay node comprises one or more user equipments (UEs), the one or more reconfigurable intelligent surfaces configured to relay signals in a wireless communications network, or a combination thereof.

7. The method of claim 6, wherein the set of operational parameters further comprise a quantity of the one or more UEs, types of the one or more UEs, capabilities of the one or more UEs, sizes of the one or more reconfigurable intelligent surfaces, path loss values associated with the one or more reconfigurable intelligent surfaces, frequency ranges supported by the one or more reconfigurable intelligent surfaces, reflection angles of the one or more reconfigurable intelligent surfaces with respect to a reference plane, or a combination thereof.

8. The method of claim 1, further comprising:
determining a link budget calculation for a wireless channel between the control node and the movable relay node, a maximum permissible exposure value for the control node, image processing data generated by sensors of the control node, a reference signal received power measurement, a signal to interference power ratio, an angle between the control node and the movable relay node, a speed message from the movable relay node, or a combination thereof, wherein transmitting the location message to the movable relay node is based at least in part on the determining.

9. The method of claim 1, further comprising:
receiving, from the movable relay node, a first message indicating the identifier of the movable relay node;
transmitting, to the movable relay node and based at least in part on receiving the first message, a second message indicating the identifier of the control node; and
receiving, from the movable relay node and based at least in part on transmitting the second message, a second sidelink transmission comprising the capability message, the identifier of the control node, and the identifier of the movable relay node.

10. The method of claim 1, further comprising:
receiving, from the second node, control signaling indicating positions of one or more transmission and reception points associated with the second node, wherein transmitting the location message to the movable relay node is based at least in part on receiving the control signaling from the second node.

11. The method of claim 10, wherein:
the control node comprises a user equipment (UE) and the second node comprises a base station; and the control signaling comprises radio resource control signaling, a medium access control control element, or both.

12. The method of claim 1, further comprising:
determining positions of one or more transmission and reception points associated with the second node based at least in part on image processing data generated by one or more sensors of the control node, wherein transmitting the location message is based at least in part on determining the positions of the one or more transmission and reception points.

13. The method of claim 1, further comprising:
receiving, from the second node, a request for the movable relay node to relay communications between the control node and the second node; and
transmitting, to the second node and in response to the request for the movable relay node, an indication that the movable relay node is positioned for the second node.

14. The method of claim 13, wherein:
the control node comprises a base station and the second node comprises a user equipment (UE); and
the indication comprises radio resource control signaling, a medium access control control element, or both.

15. The method of claim 1, wherein the second location comprises a location in a global navigation satellite system, an altitude above a reference point, or both.

16. The method of claim 1, further comprising:
determining the second location for the movable relay node based at least in part on the set of operational parameters, a set of channel measurements, image processing data generated by sensors at the control node, or a combination thereof, wherein transmitting the location message is based at least in part on determining the second location.

17. A method for wireless communications at a movable relay node, comprising:
transmitting, to a control node, a capability message indicating a set of operational parameters for the movable relay node, wherein the set of operational parameters comprise at least capability information associated with one or more reconfigurable intelligent surfaces;
receiving, from the control node and based at least in part on transmitting the capability message, a location message indicating a first location for the movable relay node, an identifier of the movable relay node, and an identifier of the control node, wherein the location message is received via a sidelink transmission; and
configuring the one or more reconfigurable intelligent surfaces at the movable relay node based at least in part on receiving the location message.

18. The method of claim 17, further comprising:
transmitting, to the control node, an indication that the movable relay node is positioned at the first location, wherein configuring the one or more reconfigurable intelligent surfaces at the movable relay node is further based at least in part on transmitting the indication.

19. The method of claim 17, further comprising:
transmitting, to the control node, an indication that the movable relay node is unable to be positioned at the first location, wherein configuring the one or more reconfigurable intelligent surfaces at the movable relay node is further based at least in part on transmitting the indication.

20. The method of claim 17, further comprising:
receiving, from a second movable relay node, a second sidelink transmission comprising a safety message, wherein configuring the one or more reconfigurable intelligent surfaces at the movable relay node is further based at least in part on receiving the sidelink transmission from the second movable relay node.

21. The method of claim 17, wherein the set of operational parameters indicated by the capability message further comprise a type of the movable relay node, a quantity of movement dimensions capable by the movable relay node, a maximum speed of the movable relay node, an average speed of the movable relay node, stability information associated the movable relay node, an altitude limit of the movable relay node, a power level of the movable relay node, a battery status of the movable relay node, or a combination thereof.

22. The method of claim 17, wherein:
the movable relay node comprises one or more user equipments (UEs); and
the set of operational parameters further comprise a quantity of the one or more UEs, types of the one or more UEs, capabilities of the one or more UEs, sizes of the one or more reconfigurable intelligent surfaces, path loss values associated with the one or more reconfigurable intelligent surfaces, frequency ranges supported by the one or more reconfigurable intelligent surfaces, reflection angles of the one or more reconfigurable intelligent surfaces with respect to a reference plane, or a combination thereof.

23. The method of claim 17, further comprising:
transmitting a first message indicating the identifier of the movable relay node;
receiving, from the control node and based at least in part on transmitting the first message, a second message indicating the identifier of the control node; and
transmitting, to the control node and based at least in part on receiving the second message, a second sidelink transmission comprising the capability message, the identifier of the movable relay node, and the identifier of the control node.

24. The method of claim 17, further comprising:
receiving, from the control node, a request to relay communications between the control node and a second node, wherein configuring the one or more reconfigurable intelligent surfaces at the movable relay node is based at least in part on receiving the request.

25. An apparatus for wireless communications at a control node, comprising:
one or more processors; and
instructions stored in one or more memories and executable by the one or more processors to cause the apparatus to:
receive, from a movable relay node, a capability message indicating a set of operational parameters for the movable relay node, wherein the set of operational parameters comprise at least capability information associated with one or more reconfigurable intelligent surfaces;
transmit, to the movable relay node at a first location and based at least in part on receiving the capability message, a location message indicating a second location for the movable relay node, an identifier of the movable relay node, and an identifier of the control node, wherein the location message is transmitted via a sidelink transmission; and
communicate with a second node via the movable relay node based at least in part on transmitting the location message.

26. The apparatus of claim 25, wherein the instructions are further executable by the one or more processors to cause the apparatus to:
receive an indication that the movable relay node is positioned at the second location, wherein communicating with the second node via the movable relay node is further based at least in part on receiving the indication.

27. An apparatus for wireless communications at a movable relay node, comprising:
one or more processors; and
instructions stored in one or more memories and executable by the one or more processors to cause the apparatus to:
transmit, to a control node, a capability message indicating a set of operational parameters for the movable relay node, wherein the set of operational parameters comprise at least capability information associated with one or more reconfigurable intelligent surfaces;
receive, from the control node and based at least in part on transmitting the capability message, a location message indicating a first location for the movable relay node, an identifier of the movable relay node, and an identifier of the control node, wherein the location message is received via a sidelink transmission; and
configure the one or more reconfigurable intelligent surfaces at the movable relay node based at least in part on receiving the location message.

28. The apparatus of claim 27, wherein the instructions are further executable by the one or more processors to cause the apparatus to:
transmit a first message indicating the identifier of the movable relay node;
receive, from the control node and based at least in part on transmitting the first message, a second message indicating the identifier of the control node; and
transmit, to the control node and based at least in part on receiving the second message, a second sidelink transmission comprising the capability message, the identifier of the movable relay node, and the identifier of the control node.

* * * * *